US011239902B2

(12) United States Patent
Matsuura et al.

(10) Patent No.: US 11,239,902 B2
(45) Date of Patent: Feb. 1, 2022

(54) MONITORING OF RADIO RELAY APPARATUS USING FEEDER LINK

(71) Applicant: SoftBank Corp., Tokyo (JP)

(72) Inventors: Kazuki Matsuura, Tokyo (JP); Yoshichika Ota, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/966,227

(22) PCT Filed: Jan. 22, 2019

(86) PCT No.: PCT/JP2019/001914
§ 371 (c)(1),
(2) Date: Jul. 30, 2020

(87) PCT Pub. No.: WO2019/151056
PCT Pub. Date: Aug. 8, 2019

(65) Prior Publication Data
US 2021/0050910 A1 Feb. 18, 2021

(30) Foreign Application Priority Data
Feb. 5, 2018 (JP) .............................. JP2018-018641

(51) Int. Cl.
*H04B 7/185* (2006.01)
*H04W 24/08* (2009.01)
(Continued)

(52) U.S. Cl.
CPC ............ *H04B 7/185* (2013.01); *H04W 24/08* (2013.01); *H04W 72/0406* (2013.01); *H04W 84/16* (2013.01)

(58) Field of Classification Search
None
See application file for complete search history.

(56) References Cited

U.S. PATENT DOCUMENTS

2015/0236778 A1  8/2015 Jalali
2016/0093950 A1* 3/2016 Cummings ............ H01Q 25/00
                                                        342/359
(Continued)

FOREIGN PATENT DOCUMENTS

CN  1943135 A  4/2007
CN  101312576 A  11/2008
(Continued)

OTHER PUBLICATIONS

Lte, ARIB, "Evolved Universal Terrestrial Radio Access (E-UTRA) and Evolved Universal Terrestrial Radio Access Network (E-UTRAN)", 3GPP TS 36.300, ARIB STD-T104-36.300, V10.12.0, Overall description, Stage 2, Release 10, Dec. 2014.
(Continued)

*Primary Examiner* — Christopher M Crutchfield
*Assistant Examiner* — Alan L Lindenbaum
(74) *Attorney, Agent, or Firm* — Muirhead and Saturnelli, LLC

(57) ABSTRACT

A radio relay apparatus, which can monitor a status of a radio relay apparatus for realizing a three-dimensional network, without providing a dedicated line, is provided. The radio relay apparatus can fly and move in an upper airspace, and comprises a first antenna for transmitting and receiving a radio signal of a feeder link to and from a gateway station on a communication network side provided on the ground or on the sea, a second antenna for transmitting and receiving a radio signal of a service link to and from a terminal apparatus, a relay processing section for relaying the radio signal of the feeder link and the radio signal of the service link, which is provided between the first antenna and the second antenna, an information acquisition section for acquiring monitoring information on the status of the radio relay apparatus, and an information communication section
(Continued)

for transmitting the monitoring information to the gateway station via the feeder link.

35 Claims, 18 Drawing Sheets

(51) Int. Cl.
*H04W 72/04* (2009.01)
*H04W 84/16* (2009.01)

(56) References Cited

U.S. PATENT DOCUMENTS

| | | | |
|---|---|---|---|
| 2017/0033455 A1* | 2/2017 | Husted | H04B 7/18504 |
| 2018/0053991 A1* | 2/2018 | Davidson | B64C 1/36 |
| 2018/0166779 A1* | 6/2018 | Feria | H04B 7/18506 |

FOREIGN PATENT DOCUMENTS

| | | |
|---|---|---|
| JP | 2001-308770 A | 11/2001 |
| JP | 2014-091335 A | 5/2014 |
| JP | 2018-127201 A | 8/2018 |
| WO | WO 02/001756 A1 | 1/2002 |
| WO | WO 2017/156463 A1 | 9/2017 |

OTHER PUBLICATIONS

Lte, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN)," 3GPP TS 36.300, V13.5.0, Overall description, State 2, Release 13, Sep. 2016.

Giovanni Romano, 3GPP RAN, "3GPP RAN progress on "5G"," TIM, 2016.

* cited by examiner

MONITORING OF RADIO RELAY APPARATUS USING FEEDER LINK

TECHNICAL FIELD

The present invention relates to a radio relay apparatus and a communication system such as a HAPS (high altitude platform station) suitable for constructing a three-dimensional network for fifth generation communication.

BACKGROUND ART

There is conventionally known a communication standard called LTE-Advanced Pro (see Non-Patent Literature 2), which is an extension of LTE (Long Term Evolution)-Advanced (see Non-Patent Literature 1) of 3GPP, which is a communication standard for mobile communication systems. In this LTE-Advanced Pro, specifications have been established for providing a communication to recent devices for IoT (Internet of Things). Furthermore, a fifth-generation mobile communication, which supports simultaneous connection to a large number of terminal apparatuses (also referred to as "UE (user equipment)", "mobile station", and "communication terminal") such as devices for IoT, and low delay, is under study (for example, see Non-Patent Literature 3).

CITATION LIST

Non-Patent Literature

Non-Patent Literature 1: 3GPP TS 36.300 V10.12.0 (2014 December).
Non-Patent Literature 2: 3GPP TS 36.300 V13.5.0 (2016 September).
Non-Patent Literature 3: G. Romano, "3GPP RAN progress on "5G"", 3GPP, 2016.

SUMMARY OF INVENTION

Technical Problem

In the fifth-generation mobile communication and the like, there is a problem of monitoring a status of a radio relay apparatus for realizing a three-dimensional network by a radio communication with a terminal apparatus including a device for IoT without providing a dedicated line.

Solution to Problem

In order to solve the above-mentioned problem, a radio relay apparatus according to an aspect of the present invention, which is a radio relay apparatus capable of flying and moving in an upper airspace, comprises a first antenna for transmitting and receiving a radio signal of a feeder link to and from a gateway station on a communication network side provided on the ground or on the sea, a second antenna for transmitting and receiving a radio signal of a service link to and from a terminal apparatus, a relay processing section for relaying the radio signal of the feeder link and the radio signal of the service link, which is provided between the first antenna and the second antenna, an information acquisition section for acquiring monitoring information on a status of the radio relay apparatus, and an information communication section for transmitting the monitoring information to the communication network side via the feeder link.

In the foregoing radio relay apparatus, the radio relay apparatus may further comprise a control section for controlling the radio relay apparatus based on control information, and the information communication section may receive the control information via the feeder link. Herein, the control information may include target flight-route information.

In the foregoing radio relay apparatus, the information communication section may comprise a monitoring antenna for transmitting and receiving the radio signal of the service link for a service-link signal path between the second antenna and the relay processing section, and a signal conversion section for converting between a reverse link signal or a forward link signal of the service link transmitted and received via the monitoring antenna, and a data signal of the monitoring information or a data signal of the control information.

In the foregoing radio relay apparatus, the information communication section may comprise a directional coupler or a divider/combiner provided in a service-link signal path between the second antenna and the relay processing section, and a signal conversion section for converting between a reverse link signal or a forward link signal of the service link transmitted and received via the directional coupler or the divider/combiner, and a data signal of the monitoring information or a data signal of the control information.

In the foregoing radio relay apparatus, the monitoring information may include information on at least one of a current position, flight-route history information, a velocity against air, a velocity against the ground and a propulsive direction of the radio relay apparatus, a wind velocity and a wind direction of an airflow around the radio relay apparatus, and an atmospheric pressure and a temperature around the radio relay apparatus, and may include at least one of communication quality information of the feeder link to and from the gateway station and communication quality information of a service link with the terminal apparatus.

In the foregoing radio relay apparatus, a frequency of the feeder link and a frequency of the service link may be different from each other, and the relay processing section may comprise a function of frequency conversion function between the frequency of the feeder link and the frequency of the service link.

In the foregoing radio relay apparatus, the gateway station may be a master repeater connected to a base station for a mobile communication, and the radio relay apparatus may be a slave repeater for performing a radio communication with the master repeater.

The radio relay apparatus may be a base station for a mobile communication.

A communication system according to an aspect of the present invention comprises any one of the foregoing radio relay apparatuses, a gateway station on the communication network side for communicating with the radio relay apparatus via the feeder link, and a monitoring apparatus on the communication network side for receiving the monitoring information.

Advantageous Effects of Invention

According to the present invention, since monitoring information regarding a status of a radio relay apparatus for realizing a three-dimensional network can be transmitted to a communication network side via a feeder link used in the radio relay apparatus, it is possible to monitor the status of the radio relay apparatus without providing a dedicated line.

DESCRIPTION OF EMBODIMENTS

Hereinafter, embodiments of the present invention are described with reference to the drawings.

Figure 1:
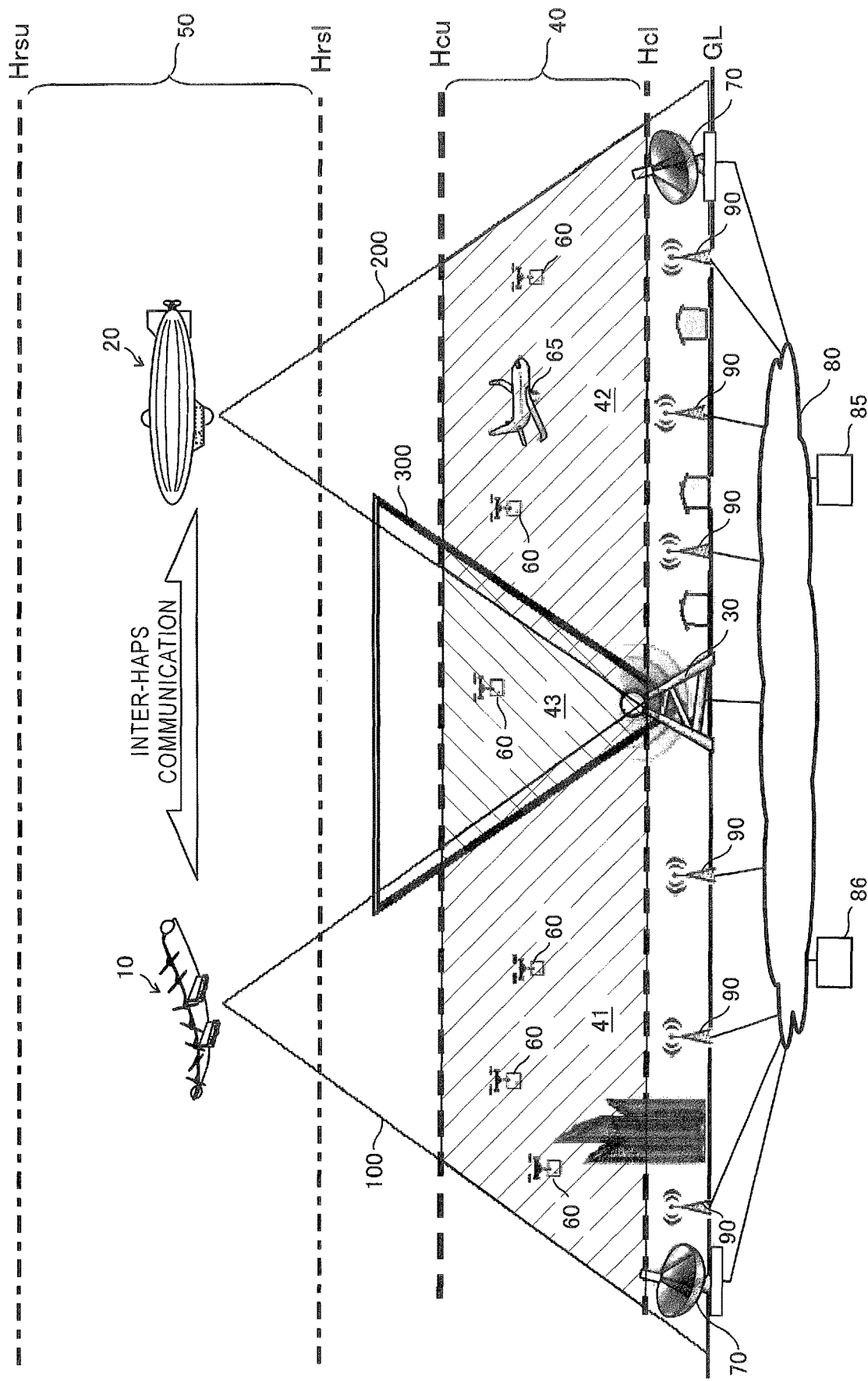
FIG. 1 is a schematic configuration diagram showing an example of an overall configuration of a communication system for realizing a three-dimensional network according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network of the fifth-generation mobile communication corresponding to a simultaneous connection to a large number of terminal apparatuses, low delay method, etc. Moreover, the mobile communication standard applicable to a communication system, a radio relay station, a base station, a repeater, and a terminal apparatus disclosed in the present description, includes a fifth-generation mobile communication standard and next generation mobile communication standards after the fifth generation.

As shown in FIG. 1, the communication system is provided with a plurality of High Altitude Platform Stations (HAPS) (also referred to as "High Altitude Pseudo Satellite") 10 and 20 as a plurality of communication relay apparatuses (radio relay apparatuses) of an aerial floating type. The HAPSs 10 and 20 are located in an airspace at a predetermined altitude, and form three-dimensional cells (three-dimensional areas) 41 and 42 as indicated by hatching areas in the figure in a cell-formation target airspace 40 at a predetermined altitude. Each of the HAPSs 10 and 20 is a floating object (for example, solar plane, airship) including a radio relay station mounted therein, which is controlled by an autonomous control or an external control so as to be floated or flied and located in an airspace (floating airspace) 50 with high altitude of 100 [km] or less from the ground level or the sea level.

The airspace 50 in which the HAPSs 10 and 20 are located is, for example, a stratospheric airspace with altitude greater than 11 [km] and less than 50 [km]. The airspace 50 may be an airspace with altitude of 15 [km] or more and 25 [km] or less where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation area near the ground level covered by a base station (for example, LTE eNodeB) 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river or a lake.

The radio relay stations of the HAPSs 10 and 20 respectively form beams 100 and 200 for a radio communication with the terminal apparatus that is a mobile station, toward the ground level. The terminal apparatus may be a communication terminal module incorporated in a drone 60 that is an aircraft such as a small helicopter capable of remotely steering, or may be a user apparatus used by a user in the airplane 65. The areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the radio relay stations of the HAPSs 10 and 20 is, for example, a base station that wirelessly communicates with a gateway station (also referred to as a "feeder station") 70 as a relay station connected to a core network on the ground (or on the sea) side, or a slave repeater that wirelessly communicates with a feeder station (master repeater) 70 as a relay station connected to a base station on the ground (or on the sea) side. Each of the radio relay stations of the HAPSs 10 and 20 is connected to the core network of the mobile communication network 80 via the feeder station 70 installed on the ground or on the sea. The communication between the HAPSs 10 and 20 and the feeder station 70 may be performed by a radio communication using radio waves such as microwaves, or may be performed by an optical communication using laser light or the like.

Each of the HAPSs 10 and 20 may autonomously control its own floating movement (flight) or a processing at the radio relay station, by executing a control program with a control section including a computer or the like incorporated in the inside of the HAPS. For example, each of the HAPSs 10 and 20 may acquire its own current position information (for example, GPS position information), position control information (for example, flight schedule information) stored in advance, and position information on another HAPS located in a peripheral space, etc., and autonomously control the floating movement (flight) and the processing in the radio relay station based on these information.

The floating movement (flight) of each HAPS 10 and 20 and the processing in the radio relay stations may be controlled by a monitoring apparatus (also referred to as a "remote control apparatus".) 85 as a management apparatus, which is provided in a communication center or the like of the mobile communication network 80. The monitoring apparatus 85 can be configured by, for example, a computer apparatus such as a PC, or a server, etc. In this case, the HAPSs 10 and 20 may include a communication terminal apparatus for control (for example, a mobile communication module) so that control information from the monitoring apparatus 85 can be received and various information such as monitoring information can be transmitted to the monitoring apparatus 85, and terminal identification information (for example, IP address, telephone number, etc.) may be allocated to the terminal communication apparatus so as to be identified from the monitoring apparatus 85. The MAC address of the communication interface may be used for identifying the communication terminal apparatus for control. Each of the HAPSs 10 and 20 may transmit information relating to the floating movement (flight) of the HAPS itself or the surrounding HAPS and the processing at the radio relay station, information relating to status of HAPSs 10 and 20, and monitoring information such as observation data acquired by various sensors or the like, to a predetermined destination such as the monitoring apparatus 85. The control information may include target flight-route information of the HAPS. The monitoring information may include at least one information on current positions, flight-route history information, velocities against air, velocities against the ground and propulsive directions of the HAPSs 10 and 20, wind velocities and directions of airflows around the HAPSs 10 and 20, and atmospheric pressures and temperatures around the HAPSs 10 and 20.

In the cell-formation target airspace 40, there is a possibility that a spatial area where the beams 100 and 200 of the HAPSs 10 and 20 do not pass may occur, in which the three-dimensional cells 41 and 42 are not formed. In order to spatially complement this area, as shown in the configuration example in FIG. 1, a base station (hereinafter referred to as "ATG station") 30 may be disposed, which forms a three-dimensional cell 43 by forming a radial beam 300 from the ground or the sea side upward to make an ATG (Air To Ground) connection.

By adjusting the positions of the HAPSs 10 and 20 and the divergence angle (beam width) or the like of the beams 100 and 200 without using the ATG station 30, the radio relay stations of the HAPSs 10 and 20 may form the beams 100 and 200 covering the overall upper end face of the cell-formation target airspace 40 so that three-dimensional cells are formed all over the cell-formation target airspace 40.

It is noted that, the three-dimensional cell formed by the HAPSs 10 and 20 may be formed so as to reach the ground level or the sea level so as to be able to communicate also with the terminal apparatus located on the ground or on the sea.

Figure 2:
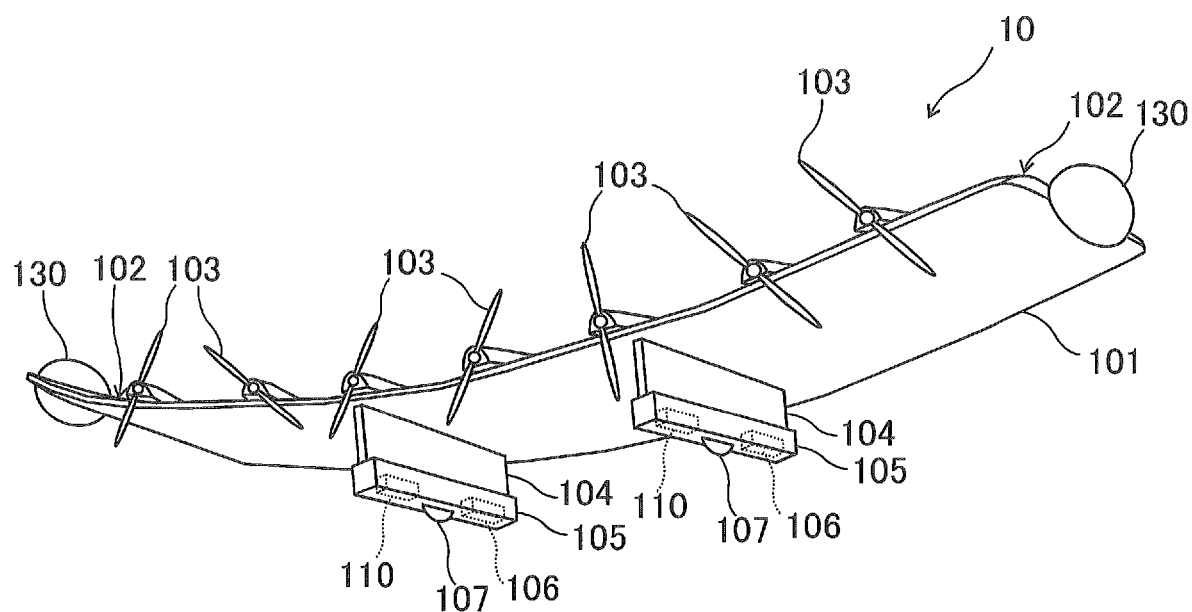
FIG. 2 is a perspective view showing an example of a HAPS used in a communication system in the embodiment.

FIG. 2 is a perspective view showing an example of the HAPS 10 used in a communication system in the embodiment.

The HAPS 10 in FIG. 2 is a solar-plane type HAPS, and has a main wing section 101, in which both end portions in the longitudinal direction are warped upward, and a plurality of motor-driven propellers 103 as propulsion apparatuses of a bus-motive power system provided at one end edge portion of the main wing section 101 in the lateral direction. A solar power generation panel (hereinafter referred to as "solar panel") 102 as a photovoltaic power generation section having a photovoltaic power generation function is provided on the upper surface of the main wing section 101. Pods 105 as a plurality of apparatus accommodating sections for accommodating the mission equipment are connected to the two positions in the longitudinal direction of the lower surface of the main wing section 101 via a plate-like connecting section 104. Inside each pod 105, a radio relay station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay processing by the radio relay station 110 is executed.

The solar-plane type HAPS 10 can float with lift force by, for example, performing a turning flight or performing a flight along a figure of "8", and can float to stay in a predetermined range in the horizontal direction at a predetermined altitude. It is noted that, the solar-plane type HAPS 10 can also fly like a glider when the propeller 103 is not rotationally driven. For example, when electric power of the battery 106 is surplus by power generation of the solar panel 102, such as in daytime, the solar plane-type HAPS 10 rises up to a high position, and when an electric power cannot be generated by the solar panel 102 such as at night, the solar plane-type HAPS 10 can stop power supply from the battery 106 to the motor and fly like a glider.

The HAPS 10 is provided with optical antenna apparatuses 130, each of which has a three-dimensional directivity, as communication sections used for the optical communication with another HAPS and an artificial satellite. It is noted that, in the example of FIG. 2, although the optical antenna apparatuses 130 are disposed at both ends of the main wing section 101 in the longitudinal direction, the optical apparatuses 130 may be disposed at other portions of the HAPS 10. It is also noted that, the communication sections used for the optical communication with another HAPS and artificial satellite is not limited to that of performing such optical communication, and the communication may be a radio communication by another method such as a radio communication using radio waves such as microwaves.

Figure 3:
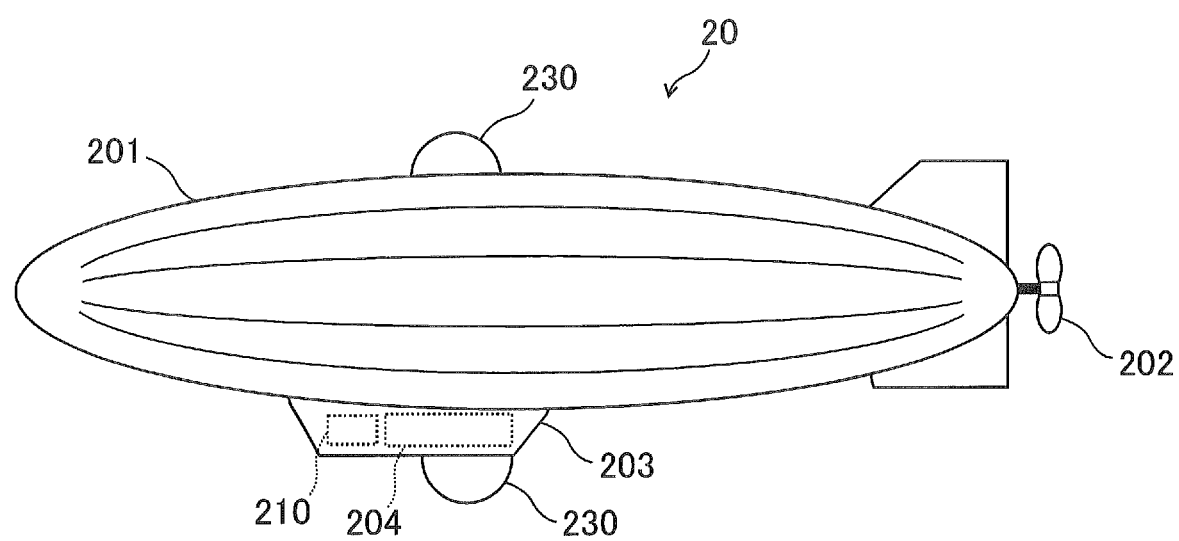
FIG. 3 is a side view showing another example of a HAPS used in the communication system in the embodiment.

FIG. 3 is a side view showing another example of the HAPS 20 used in a communication system in the embodiment.

The HAPS 20 in FIG. 3 is an unmanned airship-type HAPS, and can mount a large capacity battery since the payload is large. The HAPS 20 has an airship body 201 filled with gas such as helium gas for floating by floating power, a propeller 202 driven by a motor as a propulsion apparatus of a bus-motive power system, and an equipment accommodating section 203 in which mission equipment is accommodated. A radio relay station 210 and a battery 204 are accommodated in the equipment accommodating section 203. A motor of the propeller 202 is rotationally driven by an electric power supplied from the battery 204, and a radio relay processing by the radio relay station 210 is executed.

It is noted that, a solar panel having a photovoltaic power generation function may be provided on the top surface of the airship body 201, and an electric power generated by the solar panel is stored in the battery 204.

The unmanned airship-type HAPS 20 is also provided with optical antenna apparatuses 230, each of which has a three-dimensional directivity, as communication sections used for the optical communication with another HAPS and an artificial satellite. It is noted that, in the example of FIG. 3, although the optical antenna apparatuses 230 are disposed on the upper surface of the airship body 201 and the lower surface of the equipment accommodating section 203, the optical antenna apparatuses 230 may be disposed on other portions of the HAPS 20. It is also noted that, the communication sections used for the optical communication with another HAPS or an artificial satellites is not limited to that of performing such optical communication, and the communication may be a radio communication by another method such as a radio communication using radio waves such as microwaves.

Figure 4:
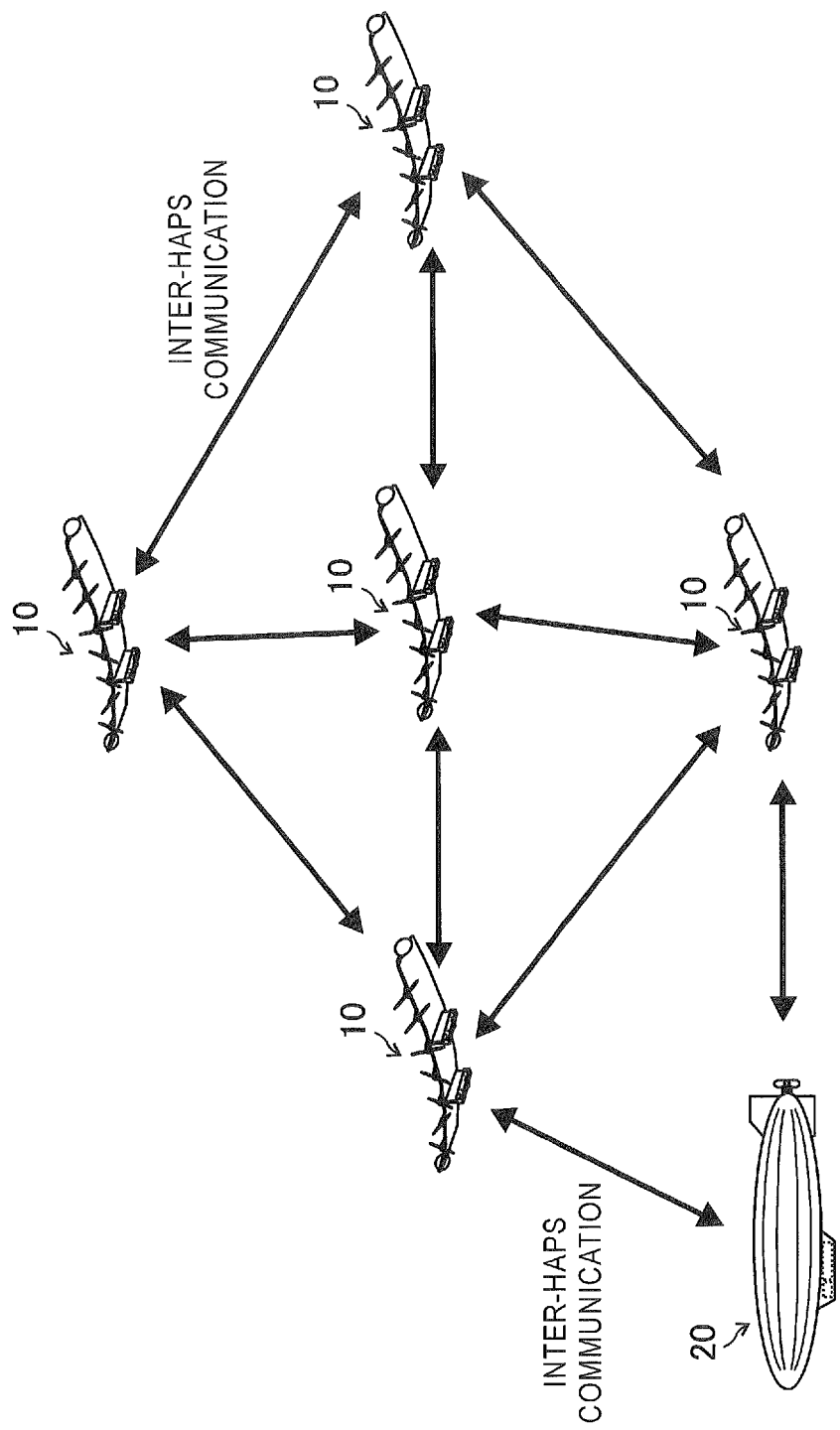
FIG. 4 is an explanatory diagram showing an example of a radio network formed in an upper airspace by a plurality of HAPSs in the embodiment.

FIG. 4 is an explanatory diagram showing an example of a radio network formed in an upper airspace by the plurality of HAPSs 10 and 20 in the embodiment.

The plurality of HAPSs 10 and 20 are configured to enable an inter-HAPS communication by the optical communication with each other in an upper airspace, and form a radio communication network with excellent robustness, which can stably realize a three-dimensional network over a wide area. This radio communication network can also function as an ad hoc network by a dynamic routing according to various environments and various information. The radio communication network can be formed to have various two-dimensional or three-dimensional topologies, and may be, for example, a mesh-type radio communication network as shown in FIG. 4.

Figure 5:
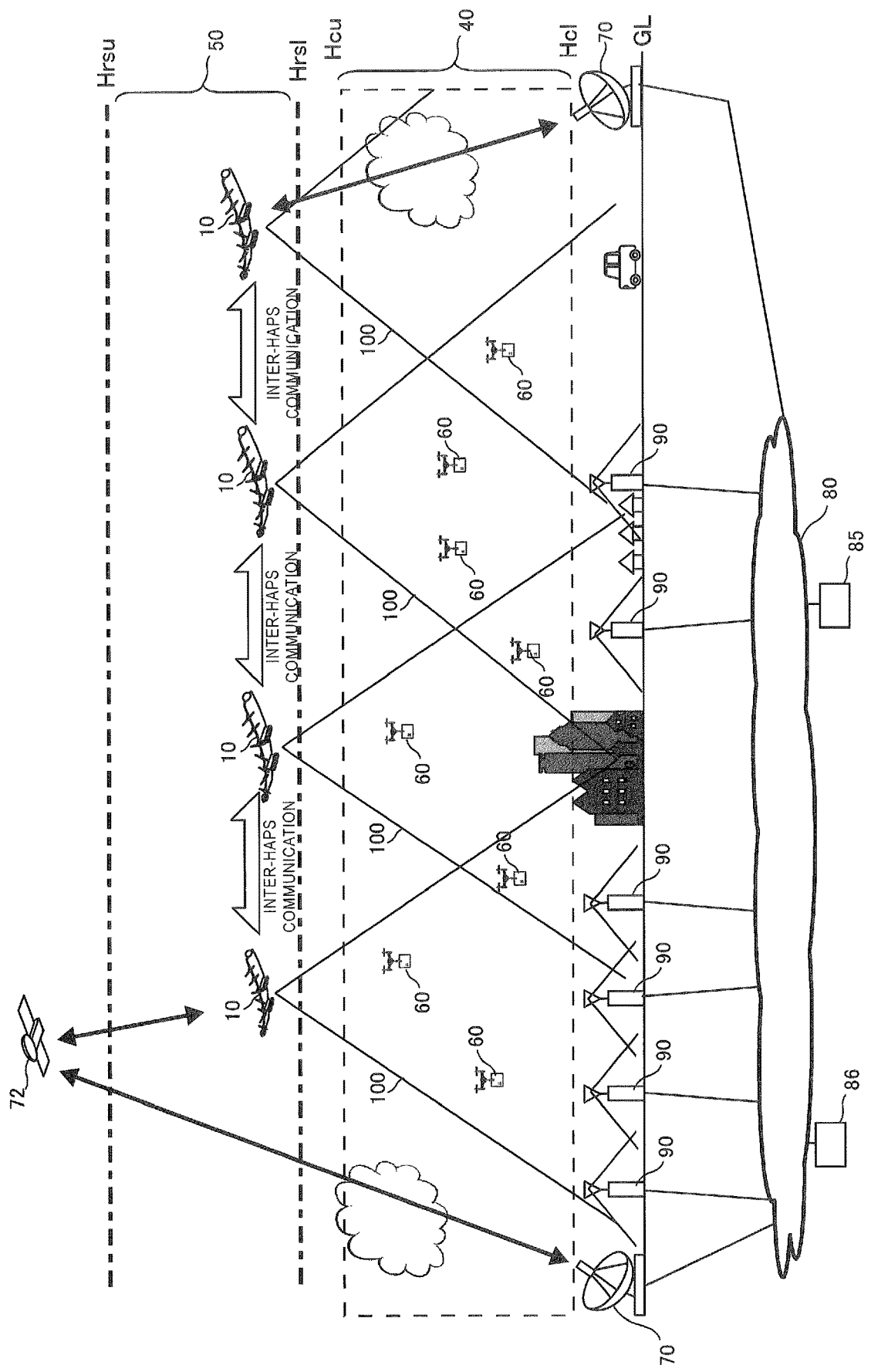
FIG. 5 is a schematic configuration diagram showing an example of an overall configuration of a communication system for realizing a three-dimensional network according to still another embodiment.

FIG. 5 is a schematic configuration diagram showing an example of an overall configuration of a communication system according to another embodiment.

It is noted that, in FIG. 5, configuration elements similar to those in FIG. 1 are denoted by the same reference numerals and explanations thereof are omitted.

In the embodiment of FIG. 5, a communication between the HAPS 10 and the core network of the mobile communication network 80 is performed via the feeder station 70 and a low-orbit artificial satellite 72. In this case, a communication between the artificial satellite 72 and the feeder station 70 may be performed by a radio communication using radio waves such as microwaves, or may be performed by an optical communication using laser light or the like. A communication between the HAPS 10 and the artificial satellite 72 is performed by the optical communication using laser light or the like.

Figure 6:
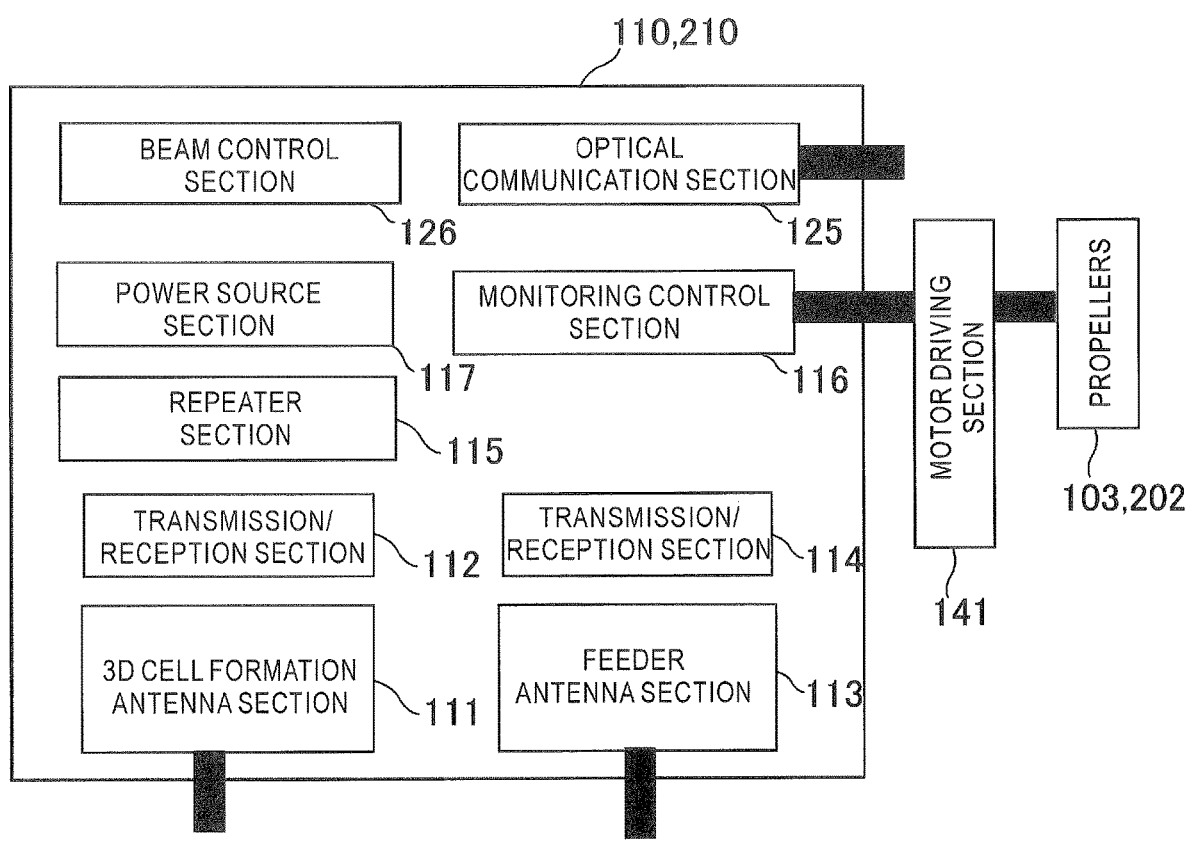
FIG. 6 is a block diagram showing a configuration example of a radio relay station of the HAPS in the embodiment.

FIG. 6 is a block diagram showing a configuration example of the radio relay stations 110 and 210 of the HAPSs 10 and 20 in the embodiment.

The radio relay stations 110 and 210 in FIG. 6 are examples of a repeater-type radio relay station. Each of the radio relay stations 110 and 210 includes a 3D cell-formation antenna section 111, a transmission/reception section 112, a feeder antenna section 113, a transmission/reception section 114, a repeater section 115, a monitoring control section 116 and a power source section 117. Furthermore, each of the radio relay stations 110 and 210 includes an optical communication section 125 used for the inter-HAPS communication and the like, and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a first radio communication section together with the 3D cell-formation antenna section 111, has a transmission/reception duplexer (DUP: DUPlexer) and an amplifier, etc., and transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 constitutes a second radio communication section together with the feeder antenna section 113, has a transmission/reception duplexer (DUP: DUPlexer) and an amplifier, etc., and transmits radio signals to the feeder station 70 and receives radio signals from the feeder station 70 via the feeder antenna section 113.

The repeater section 115 relays signals of the transmission/reception section 112 which is transmitted to and received from the terminal apparatus and signals of the transmission/reception section 114 which is transmitted to and received from the feeder station 70. The repeater section 115 has an amplifier function for amplifying a relay target signal of a predetermined frequency to a predetermined level. The repeater section 115 may have a frequency conversion function for converting the frequency of the relay target signal.

The monitoring control section 116 is configured with, for example, a CPU and a memory, etc., and monitors the operation processing status of each section and controls each section in the HAPSs 10 and 20, by executing a preinstalled program. In particular, the monitoring control section 116 controls a motor drive section 141 that drives the propellers 103 and 202 to move the HAPSs 10 and 20 to target positions, and also controls the HAPSs 10 and 20 to stay in the vicinity of the target positions, by executing a control program.

The power source section 117 supplies an electric power outputted from the batteries 106 and 204 to each section in the HAPSs 10 and 20. The power source section 117 may have a function for storing an electric power generated by the solar power generation panel or the like and an electric power supplied from the outside in the batteries 106 and 204.

The optical communication section 125 communicates with neighboring other HAPSs 10 and 20 and the artificial satellite 72 via an optical communication medium such as laser light. This communication enables a dynamic routing that dynamically relays a radio communication between the mobile communication network 80 and a terminal apparatus such as the drone 60, and can enhance a robustness of the mobile communication system by backing up and relaying wirelessly with the other HAPSs when one of the HAPSs fails.

The beam control section 126 controls a direction and intensity of a beam of laser light or the like used for the inter-HAPS communication or the communication with the artificial satellite 72, and performs a control so as to switch another HAPS (radio relay station) that performs a communication using a light beam such as the laser light according to a change in relative position with neighboring another HAPS (radio relay station). This control may be performed based on, for example, a position and posture of the HAPS itself, a position of the neighboring HAPS, and the like. Information on the position and attitude of the HAPS itself may be acquired based on an output of a GPS receiver, a gyro sensor, an acceleration sensor or the like incorporated in the HAPS, and information on the position of the neighboring HAPS may be acquired from the monitoring apparatus 85 provided in the mobile communication network 80 or a server 86 such as a HAPS management server or an application server.

Figure 7:
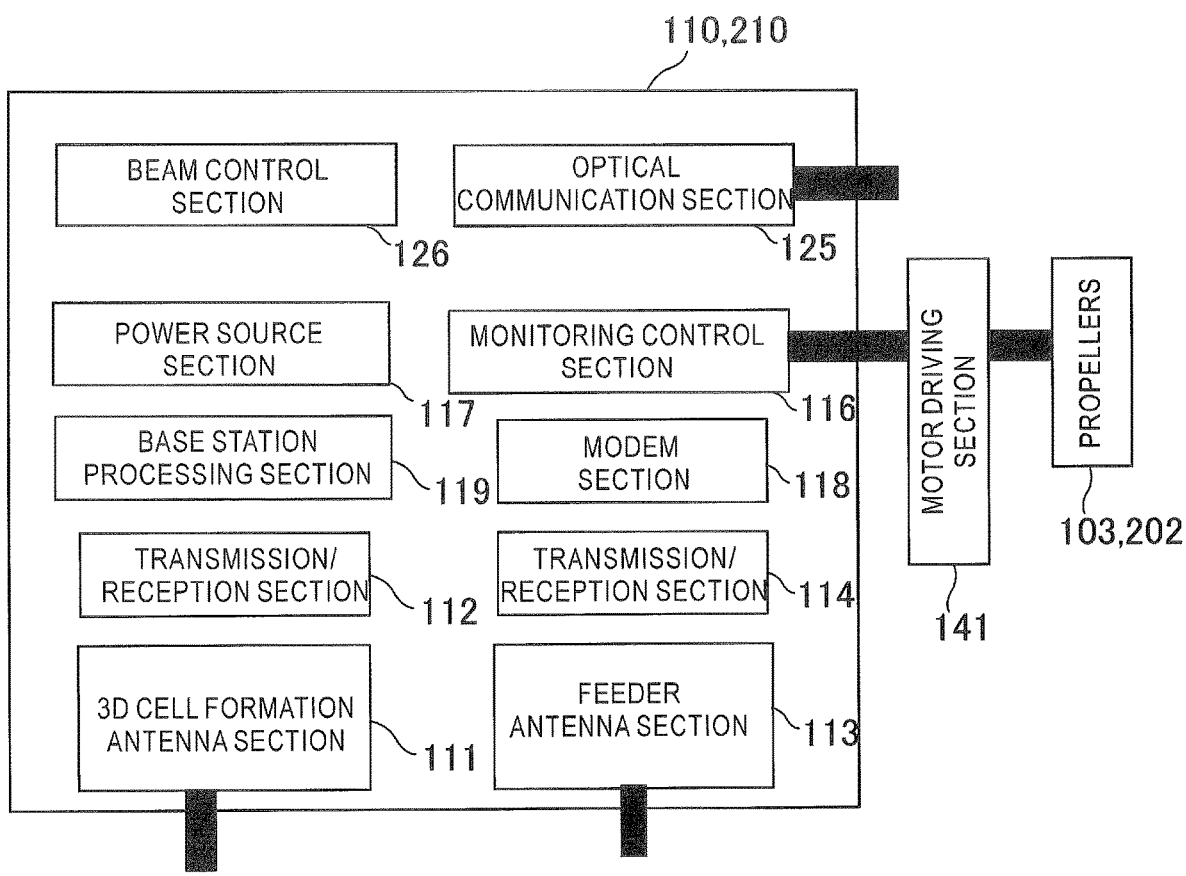
FIG. 7 is a block diagram showing another configuration example of a radio relay station of the HAPS in the embodiment.

FIG. 7 is a block diagram showing another configuration example of the radio relay stations 110 and 210 of the HAPSs 10 and 20 in the embodiment.

The radio relay stations 110 and 210 in FIG. 7 are examples base station type of radio relay stations.

It is noted that, in FIG. 7, configuration elements similar to those in FIG. 6 are denoted by the same reference numerals and explanations thereof are omitted. Each of the radio relay stations 110 and 210 in FIG. 7 further includes a modem section 118 and a base-station processing section 119 instead of the repeater section 115. Further, each of the radio relay stations 110 and 210 includes the optical communication section 125 and the beam control section 126.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119. The modem section 118 performs an encoding processing and a modulation processing for the data signal received from the base-station processing section 119, and generates a transmission signal to be transmitted to the feeder station 70 via the feeder antenna section 113 and the transmission/reception section 114.

The base-station processing section 119, for example, has a function as an e-Node B that performs a baseband processing based on a method conforming to the standard of LTE/LTE-Advanced. The base-station processing section 119 may process in a method conforming to a future standard of mobile communication such as the fifth generation.

The base-station processing section 119, for example, performs a demodulation processing and a decoding processing for a reception signal received from a terminal apparatus located in the three-dimensional cells 41 and 42 via the 3D cell-formation antenna section 111 and the transmission/reception section 112, and generates a data signal to be outputted to the modem section 118. The base-station processing section 119 performs an encoding processing and a modulation processing for the data signal received from the modem section 118, and generates a transmission signal to be transmitted to the terminal apparatus of the three-dimensional cells 41 and 42 via the 3D cell-formation antenna section 111 and the transmission/reception section 112.

Figure 8:
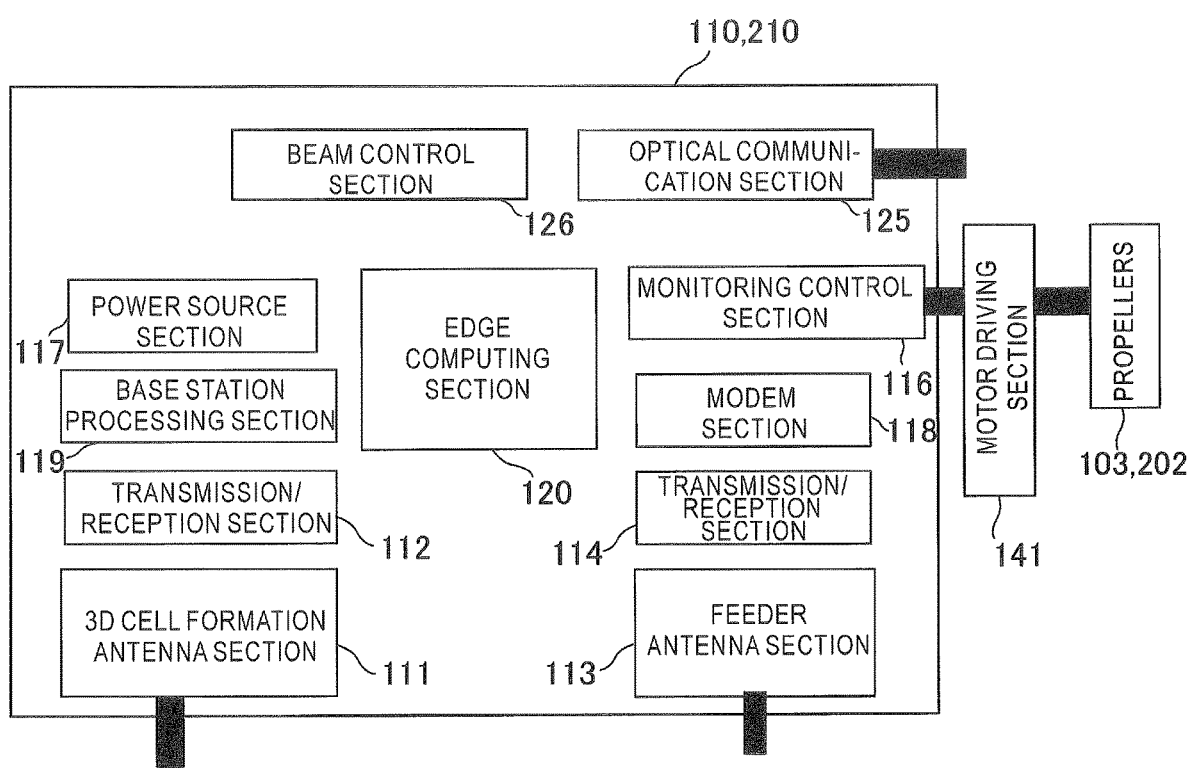
FIG. 8 is a block diagram showing still another configuration example of a radio relay station of the HAPS in the embodiment.

FIG. 8 is a block diagram showing still another configuration example of radio relay stations 110 and 210 of the HAPSs 10 and 20 in the embodiment.

The radio relay stations 110 and 210 in FIG. 8 are examples of high-performance base-station type of radio relay stations having an edge computing function. It is noted that, in FIG. 8, configuration elements similar to those in FIG. 6 and FIG. 7 are denoted by the same reference numerals and explanations thereof are omitted. Each of the radio relay stations 110 and 210 in FIG. 8 further includes an edge computing section 120 in addition to the configuration elements in FIG. 7.

The edge computing section 120 is configured with, for example, a compact computer, and can perform various types of information processing relating to a radio relay and the like in the radio relay stations 110 and 210 of the HAPSs 10 and 20, by executing a preinstalled program.

The edge computing section 120, for example, determines a transmission destination of a data signal based on the data signal received from a terminal apparatus located in the three-dimensional cells 41 and 42, and performs a process of switching a relay destination of communication based on the determination result. More specifically, in case that the transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119, and transmits the data signal to the terminal apparatus of the transmission destination located in the own three-dimensional cells 41 and 42. On the other hand, in case that the transmission destination of the data signal outputted from the base-station processing section 119 is a terminal apparatus located in another cell other than the own three-dimensional cells 41 and 42, the edge computing section 120 passes the data signal to the modem section 118 and transmits the data signal to the feeder station 70, and transmits the data signal to the terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to a large number of terminal apparatuses located in the three-dimensional cells 41 and 42, and may be transmitted to the monitoring apparatus 85 provided in the mobile communication network 80, or the server 86 such as a HAPS management server as a management apparatus and an application server (App server).

Uplink and downlink duplex methods for radio communication with a terminal apparatus via the radio relay stations 110 and 210 are not limited to a specific method, and may be, for example, a time division duplex method (Time Division Duplex: TDD) or a frequency division duplex method (Frequency Division Duplex: FDD). An access method for radio communication with a terminal apparatus via the radio relay stations 110 and 210 is not limited to a specific method, and may be, for example, FDMA (Frequency Division Multiple Access) method, TDMA (Time Division Multiple Access) method, CDMA (Code Division Multiple Access) method or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different terminal apparatuses at the same time/same frequency or a plurality of different base stations transmit signals to one terminal apparatus at the same time/same frequency.

Hereinafter, although a case where a radio relay apparatus for performing a radio communication with a terminal apparatus is the solar-plane type HAPS 10 having the radio relay station 110 is be described, the following embodiments can be similarly applied to another radio relay apparatus capable of moving in an upper airspace such as the unmanned-airship type HAPS 20 having the radio relay station 210.

A link between the HAPS 10 having the radio relay station 110 and a gateway station (hereinafter abbreviated as "GW station") 70 as a feeder station is referred to as a "feeder link", and a link between the HAPS 10 and the terminal apparatus 61 is referred to as a "service link". A communication from the GW station 70 to the terminal apparatus 61 via the HAPS 10 is referred to as a "forward link", and a communication from the terminal apparatus 61 to the GW station 70 via the HAPS 10 is referred to as a "reverse link".

Figure 9:
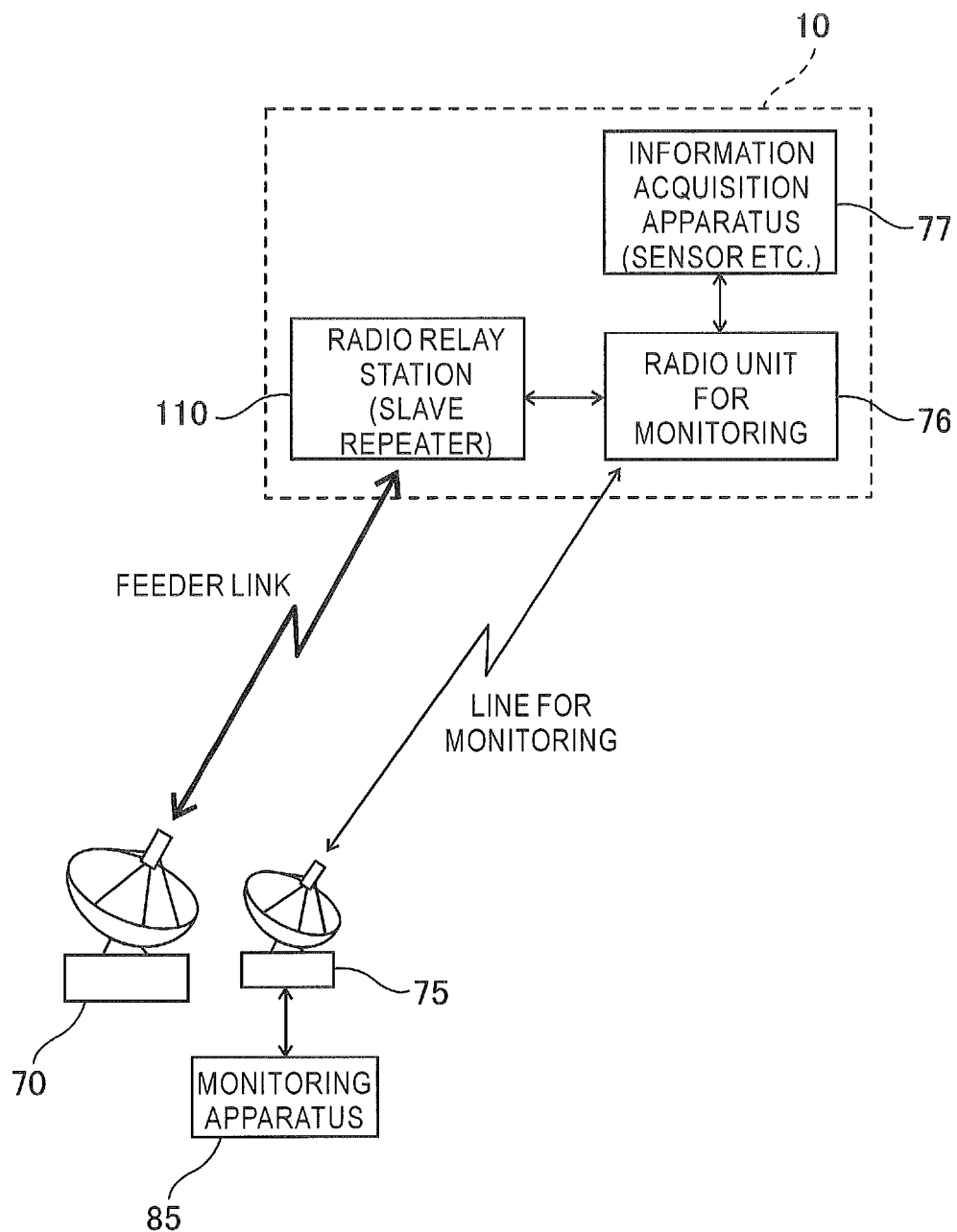
FIG. 9 is a block diagram showing a configuration of a HAPS monitoring system according to a reference example.

FIG. 9 is a block diagram showing a configuration of a HAPS monitoring system according to a reference example. In the example in FIG. 9, in order to construct a line for monitoring which is a dedicated line different from the feeder link between the HAPS 10 and the communication network side, a radio unit for monitoring 75 is provided on the communication network side, and a radio unit for monitoring 76 is provided on the HAPS 10 side. Monitoring information, which acquired by an information acquisition apparatus 77 such as the radio relay station (slave repeater) 110 and various sensors of the HAPS 10 and transmitted by the radio unit for monitoring 76, is received by the radio unit for monitoring 75 via the line for monitoring and transmitted to the monitoring apparatus 85. In the example in FIG. 9, in order to construct the line for monitoring that is the dedicated line between the HAPS 10 and the mobile communication network side, it is necessary to secure a frequency and dispose the radio unit for monitoring 75 on the communication network side.

Therefore, in each of the following embodiments, by transmitting the monitoring information to the mobile communication network side via the feeder link used in the radio relay station 110 of the HAPS 10, a status of the radio relay station 110 of the HAPS 10 can be monitored without providing the dedicated line (line for monitoring) that requires the frequency for monitoring and the radio unit for monitoring 75 on the communication network side.

Figure 10:
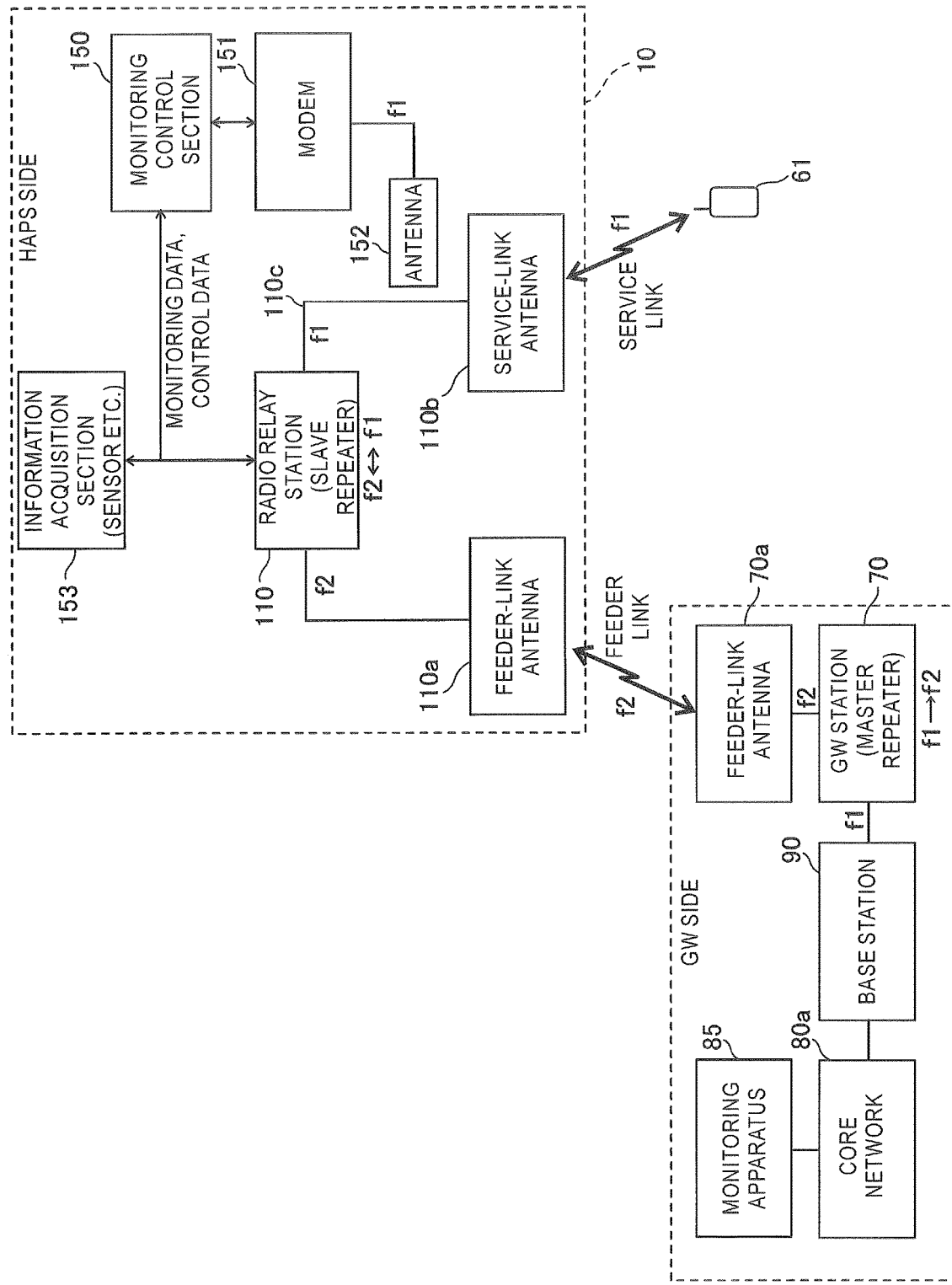
FIG. 10 is a block diagram showing a configuration example of a HAPS monitoring system according to the embodiment.

FIG. 10 is a block diagram showing an example of a HAPS monitoring system according to the embodiment. In FIG. 10, the monitoring apparatus 85 provided on the GW side is connected to a core network 80a of the mobile communication network, and can communicate with the radio relay station (slave repeater) 110 as a relay processing section of the HAPS 10 via the base station (eNodeB) 80 and the GW station (master repeater) 70. For example, the monitoring apparatus 85 can transmit a control data to a monitoring control section 150 via a modem 151 provided in the HAPS 10, and can receive a monitoring data from the monitoring control section 150 via the modem 151.

The GW station 70 can transmit and receive a signal of frequency f1 to and from the base station 90. The GW station 70 includes a feeder-link antenna 70a for performing a radio communication with the radio relay station 110 of the HAPS 10 via a feeder link of frequency f2. The GW station 70 has a frequency conversion function between the frequency f1 on the base station side and the frequency f2 on the feeder link, and relays between the signal of the frequency f1 on the base station side and the feeder link signal of the frequency f2 on the HAPS side.

The HAPS 10 includes the radio relay station (slave repeater) 110. The radio relay station 110 includes a feeder-link antenna 110a as a first antenna for performing a radio communication with the GW station 70 via the feeder link of the frequency f2, and a service-link antenna 110b as a second antenna for performing a radio communication with the terminal apparatus 61 via the service link of the frequency f1. The radio relay station 110 has a frequency conversion function between the frequency f1 of the service link and the frequency f2 of the feeder link, and relays between the service link signal of the frequency f1 on the terminal apparatus side and the feeder link signal of the frequency f2 on the GW station side.

In order to remotely monitor and control the HAPS 10 from the monitoring apparatus 85, the HAPS 10 includes a monitoring control section 150, an information communication section including the modem 151 and an antenna 152, and an information acquisition section 153 including various sensors and the like, in addition to the radio relay station (slave repeater) 110. The monitoring control section 150 is configured with, for example, a data processing section such as a processor and a data storage section such as a memory, and can acquire monitoring information from the information acquisition section 153 and the radio relay station 110, and transmits a monitoring data including the monitoring information to the modem 151 of the information communication section, by executing a predetermined program. The monitoring control section 150 receives a control data from the monitoring apparatus 85 outputted from the modem 151, and can control the radio relay station 110 and the information acquisition section 153 based on the control information included in the control data.

The modem 151 is, for example, a modem compatible with a communication system which relays a radio communication of the LTE, 5G, etc. As with a normal terminal apparatus, a terminal identification number (for example, a telephone number or an IP address) may be assigned to the modem 151 so that a data can be transmitted to and received from an external apparatus such as the monitoring apparatus 85. The modem 151 performs a data processing and a signal processing such as a modulation on the monitoring data received from the monitoring control section 150, and transmits it as a reverse link signal (frequency: f2) of the service link from the antenna 152. Further, the modem 151 performs a signal processing and a data processing such as a demodulation of a forward link signal of the service link received via the antenna 152, and restores the control data transmitted from the monitoring apparatus 85 and transfers it to the monitoring control section 150.

Since the signal transmitted and received by the modem 151 is affected by a communication quality when the radio relay station (slave repeater) 110 communicates with the GW station 70 via the feeder link, the modem 151 may measure the communication quality of the feeder link when transmitting/receiving the monitoring data and the control data. The monitoring control section 150 acquires the measurement result of the communication quality of the feeder link as one of the monitoring data.

The antenna 152 is disposed, for example, in a non-contact state and close to a service-link signal path 110c between the radio relay station 110 and the service-link antenna 110b, and the service-link antenna 110b. The antenna 152 transmits a reverse link signal (frequency: f1) of the service link including the monitoring data received from the modem 151 toward the service-link signal path 110c or toward the service-link antenna 110b. Further, the antenna 152 receives a leaked radio wave (frequency: f1) of a forward link signal of a service link that is leaked from the service-link signal path 110c, and receives a leaked radio wave (a wraparound radio wave) of a forward link signal of a service link that is leaked or wrapped around from the service-link antenna 110b.

The information acquisition section 153 may include, for example, at least one of a GPS receiving apparatus, an acceleration sensor, a gravity sensor, a gyro sensor, and an altimeter for measuring a current position, an attitude, etc. of the HAPS 10. The information acquisition section 153 may include at least one of a sensor for detecting a wind velocity and a wind direction of an airflow around the HAPS 10, a barometric pressure sensor for detecting an atmospheric pressure around the HAPS 10, and a sensor for detecting a temperature and humidity around the HAPS 10.

The control information may include target flight-route information for controlling the HAPS 10 to fly along a preset flight path. The monitoring information includes at least one information on a current position, flight-route history information, a velocity against air, a velocity against the ground and a propulsive direction of the HAPS 10, a wind velocity and a wind direction of an airflow around the HAPS 10, and a pressure and a temperature around the HAPS 10. The monitoring information may include at least one of communication quality information of a feeder link to and from the GW station 70 and communication quality information of a service link to and from the terminal apparatus 61. For example, the monitoring control section 150 may acquire the information on the communication quality from the radio relay station 110.

Figure 11:
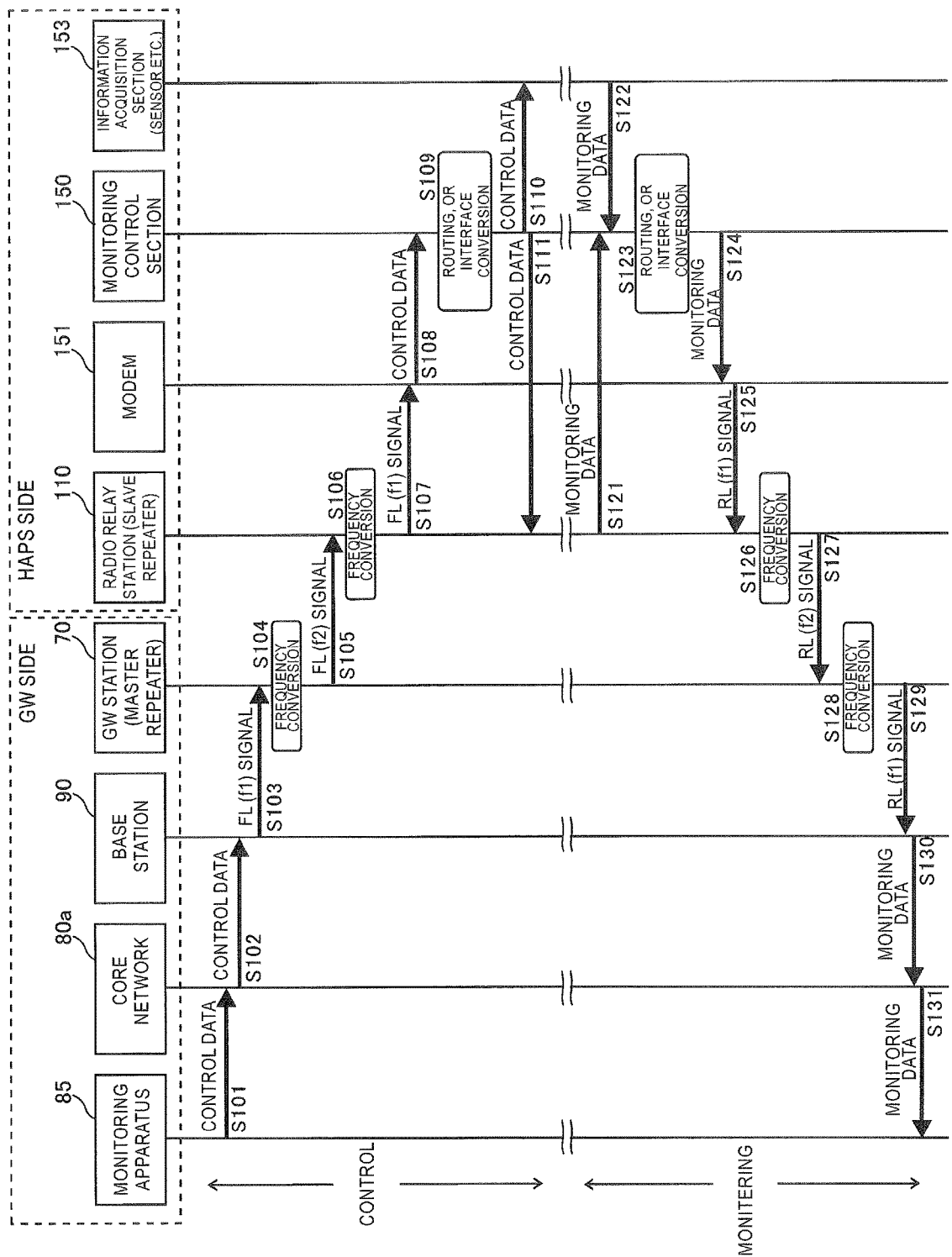
FIG. 11 is a sequence diagram showing an example of a data flow in the HAPS monitoring system in FIG. 10.

FIG. 11 is a sequence diagram showing an example of a data flow in a HAPS monitoring system in FIG. 10.

In a remote control of the HAPS 10 in FIG. 11, the monitoring apparatus 85 transmits a control data including control information to the base station 90 via the core network 80a (S101, S102). When receiving the control data from the monitoring apparatus 85, the base station 90 transmits a forward link (FL) signal of the frequency f1 generated based on the control data, to the GW station (master repeater) 70 (S103). The GW station 70 converts the frequency f1 of the forward link (FL) signal to the frequency f2 of the feeder link, and transmits the forward link (FL) signal of the frequency f2 after the frequency conversion, from the feeder-link antenna 70a to the HAPS 10 (S104, S105).

When the radio relay station (slave repeater) 110 of the HAPS 10 receives the forward link (FL) signal of the feeder link of the frequency f2 from the GW station 70 via the feeder-link antenna 110a, the radio relay station 110 converts the frequency f2 of the forward link (FL) signal to the frequency f1, and transmits it toward the service-link antenna 110b, as a forward link (FL) signal of the service link (S106, S107). The modem 151 receives the forward link (FL) signal of the service link, which is transmitted from the radio relay station 110 and transmitted through the service-link signal path 110c, via the antenna 152 (S107). The modem 151 performs a demodulation processing and a data processing on the received forward link (FL) signal of the service link, restores the control data included in the forward link (FL) signal, and transmits the control data to the monitoring control section 150 (S108). When receiving the control data from the modem 151, the monitoring control section 150 performs a routing process or an interface process on the control data, and transmits the control data to at least one of the radio relay station 110 and the information acquisition section 153 (S109 to S111). The radio relay station 110 and the information acquisition section 153 can perform various controls based on the control information included in the control data transmitted from the monitoring control section 150.

In a remote monitoring of the HAPS 10 in FIG. 11, when the monitoring control section 150 of the HAPS 10 receives the monitoring data including the monitoring information from at least one of the radio relay station 110 and the information acquisition section 153, the monitoring control section 150 performs a routing process or an interface process on the monitoring data and transmits the monitoring data to the modem 151 (S121 to S124). When receiving the monitoring data from the monitor control section 150, the modem 151 performs a data processing and a modulation processing on the monitoring data, generates a reverse link (RL) signal of the service link of the frequency f1, and transmits the reverse link (RL) signal toward the service-link signal path 110c or the service-link antenna 110b via the antenna 152 (S125). The reverse link (RL) signal of the service link from the modem 151, which is received by the service-link signal path 110c or the service-link antenna 110b, is transmitted through the service-link signal path 110c and received by the radio relay station (slave repeater) 110. The radio relay station 110 converts the frequency f1 of the reverse link (RL) signal of the service link to the frequency f2 of the feeder link, and transmits the reverse link (RL) signal of the frequency f2 after the frequency conversion, from the feeder-link antenna 110a to the GW station 70 (S126, S127).

When the GW station 70 receives the reverse link (RL) signal of the feeder link of the frequency f2 from the radio relay station (slave repeater) 110 of the HAPS 10 via the feeder-link antenna, the GW station 70 converts the frequency f2 of the reverse link (RL) signal to the frequency f1 and transmits the reverse link (RL) signal of the frequency f1 after the frequency conversion to the base station 90 (S128, S129). The base station 90 performs a demodulation processing and a data processing on the reverse link (RL) signal received from the GW station 70, restores a monitoring data included in the reverse link (RL) signal, and transmits the monitoring data to the monitoring apparatus 85 via the core network 80a (S130, S131). When receiving the monitoring data from the base station 90, the monitoring apparatus 85 can, for example, display monitoring information included in the monitoring data, update or newly create control information based on the monitoring information, and transmit the monitoring information to a predetermined transmission destination.

As described above, according to the embodiment in FIG. 10 and FIG. 11, since the monitoring information, which is associated with a status of the HAPS 10 having the radio relay station 110 that functions as a slave repeater for realizing a three-dimensional network, can be transmitted to the monitoring apparatus 85 connected to the core network 80a via the feeder link used in the HAPS 10, the status of the HAPS 10 can be monitored from the communication network side without providing a dedicated line.

Particularly, according to the present embodiment, since a large-capacity feeder link is used for communications of a monitoring data and a control data, a large-capacity monitoring data and control data can be transmitted and received between the monitoring apparatus 85 and the HAPS 10.

According to the present embodiment, since the antenna 152 of the modem 151 incorporated in the HAPS 10 is disposed close to the service-link signal path 110c or the service-link antenna 110b of the radio relay station 110 in a non-contact state, there is no need to change the configurations of the service-link signal path 110c and the service-link antenna 110b.

Further, according to the present embodiment, since the frequency f1 of the service link, in which the radio signals of the monitoring data and the control data are transmitted and received from the antenna 152 of the modem 151, is different from the frequency f2 of the feeder link, it is possible to avoid interference of radio signals of the monitoring data and the control data with the feeder link.

As described above, it is possible to monitor the HAPS 10 from the mobile communication network 80 side while avoiding interference with the feeder link without significantly changing the configuration of the HAPS 10 capable of flying and moving in the upper airspace.

Figure 12:
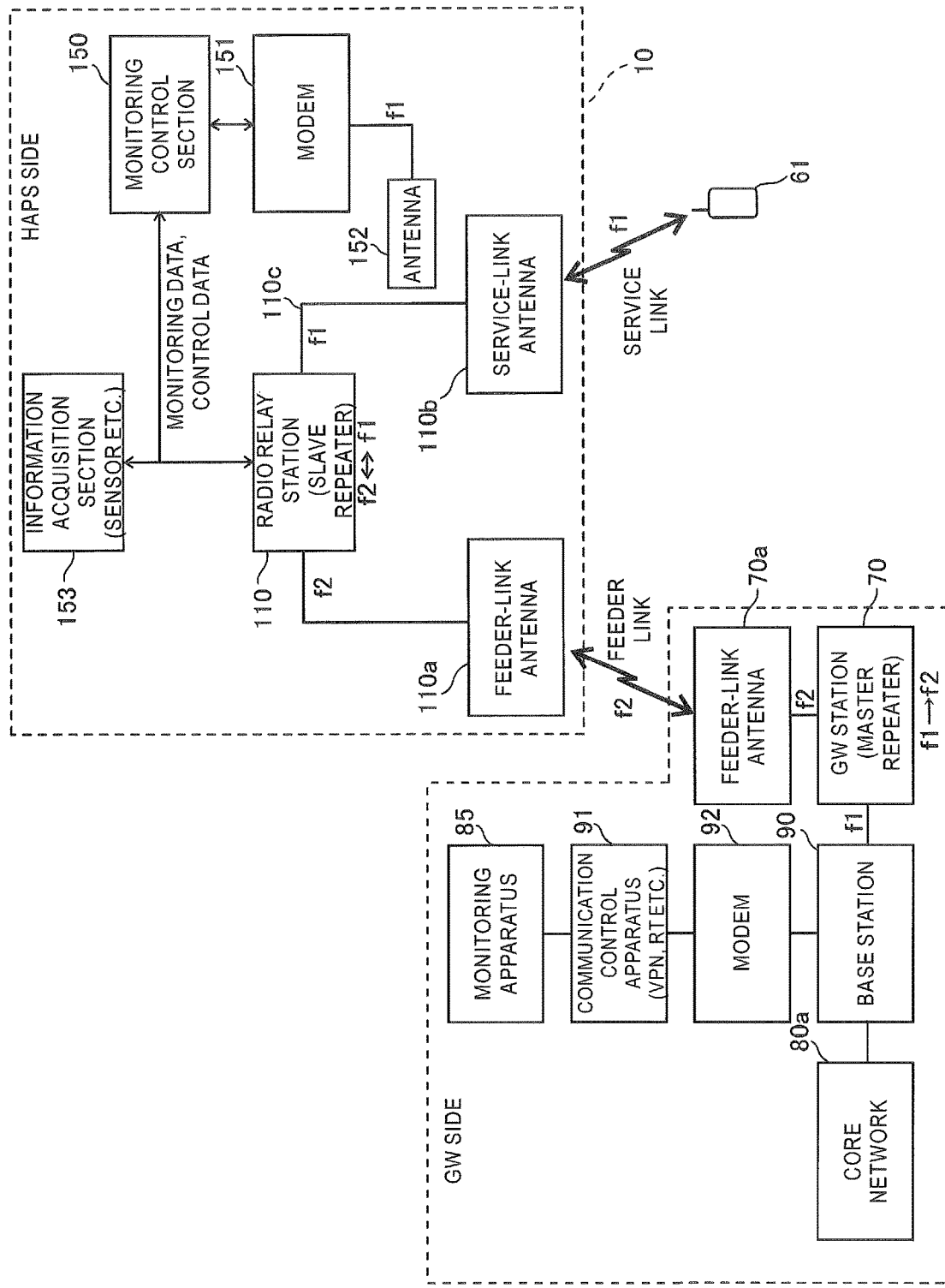
FIG. 12 is a block diagram showing another configuration example of a HAPS monitoring system according to the embodiment.
Figure 13:
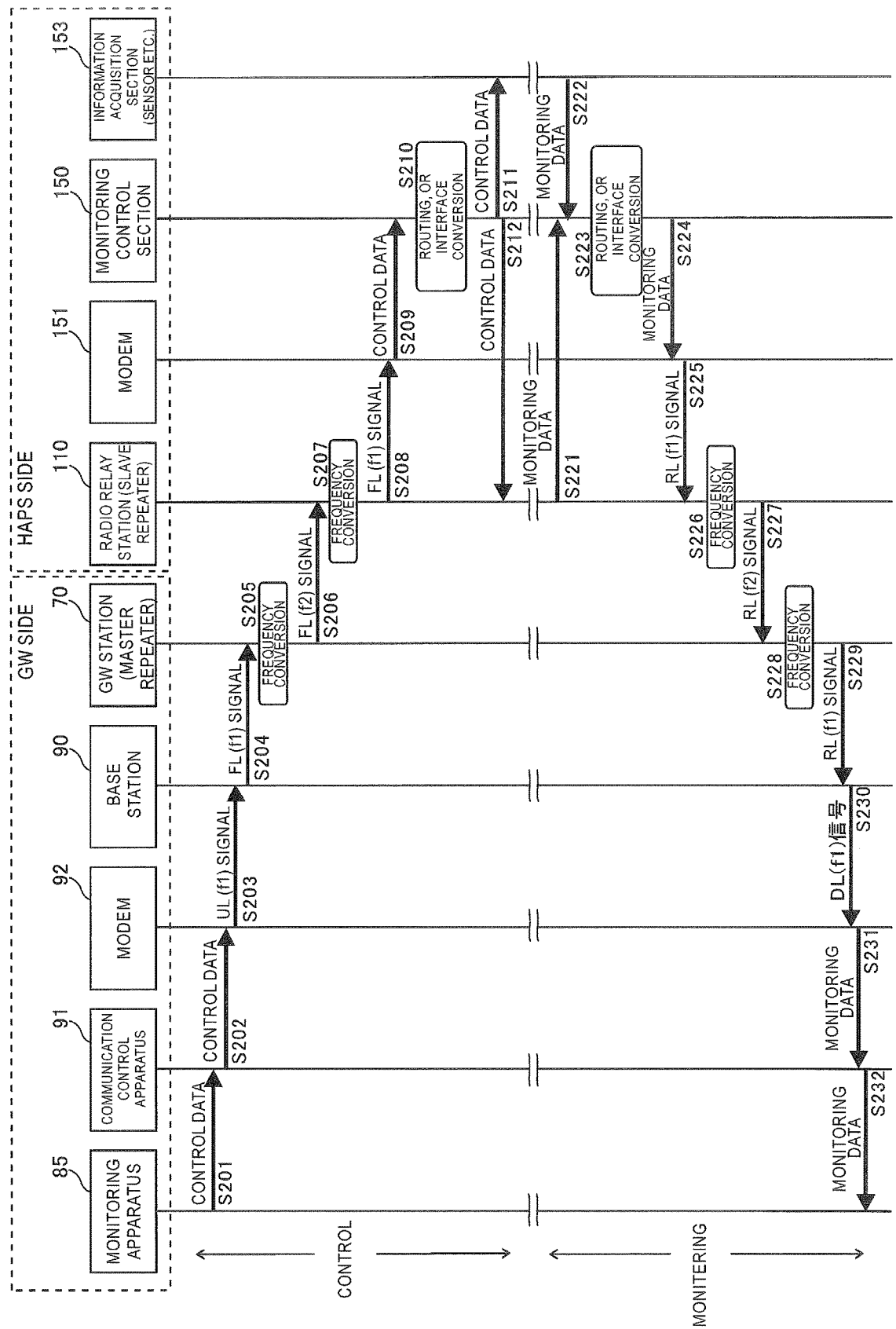
FIG. 13 is a sequence diagram showing an example of a data flow in the HAPS monitoring system in FIG. 12.

FIG. 12 is a block diagram showing another configuration example of a HAPS monitoring system according to the embodiment, and FIG. 13 is a sequence diagram showing an example of a data flow in the HAPS monitoring system in FIG. 12. It is noted that, in FIG. 12 and FIG. 13, explanations of portions common to those in FIG. 10 and FIG. 11 described above are omitted.

In the HAPS monitoring system in FIG. 12, the monitoring apparatus 85 of the GW side is connected to the base station 90 via a communication control apparatus 91 and a modem 92. The communication control apparatus 91 is, for example, a VPN (Virtual Private Network) server or a RT (router).

In a remote control of the HAPS 10 in FIG. 13, the control data transmitted from the monitoring apparatus 85 is transmitted to the modem 92 via the communication control apparatus 91 (S201, S202). When receiving the control data from the monitoring apparatus 85, the modem 92 transmits, to the base station 90 as an uplink (UL) signal, the signal of the frequency f1 generated based on the control data (S203). When receiving the uplink (UL) signal including the control data from the modem 92, the base station 90 converts the uplink (UL) signal to a forward link (FL) signal of the frequency f1, and transmits the forward link (FL) signal to the GW station (master repeater) 70 (S204).

In the remote monitoring of the HAPS 10 in FIG. 13, when receiving a reverse link (RL) signal including a monitoring data from the GW station 70, the base station 90 converts the reverse link (RL) signal to a downlink (DL) signal of the frequency f1, and transmits the downlink (DL) signal to the modem 92 (S229, S230). The modem 92 performs a demodulation processing and a data processing on the downlink (DL) signal received from the base station 90, restores a monitoring data included in the downlink signal, and transmits the monitoring data to the monitoring apparatus 85 via the communication control apparatus 91 (S231, S232).

As described above, according to the embodiment in FIG. 12 and FIG. 13, since the monitoring information, which is associated with a status of the HAPS 10 having the radio relay station 110 that functions as a slave repeater for realizing a three-dimensional network, can be transmitted to the monitoring apparatus 85 connected to the base station 90 by the communication control apparatus 91 and modem 92 via the feeder link used in the HAPS 10, the status of the HAPS 10 can be monitored from the communication network side without providing a dedicated line.

Figure 14:
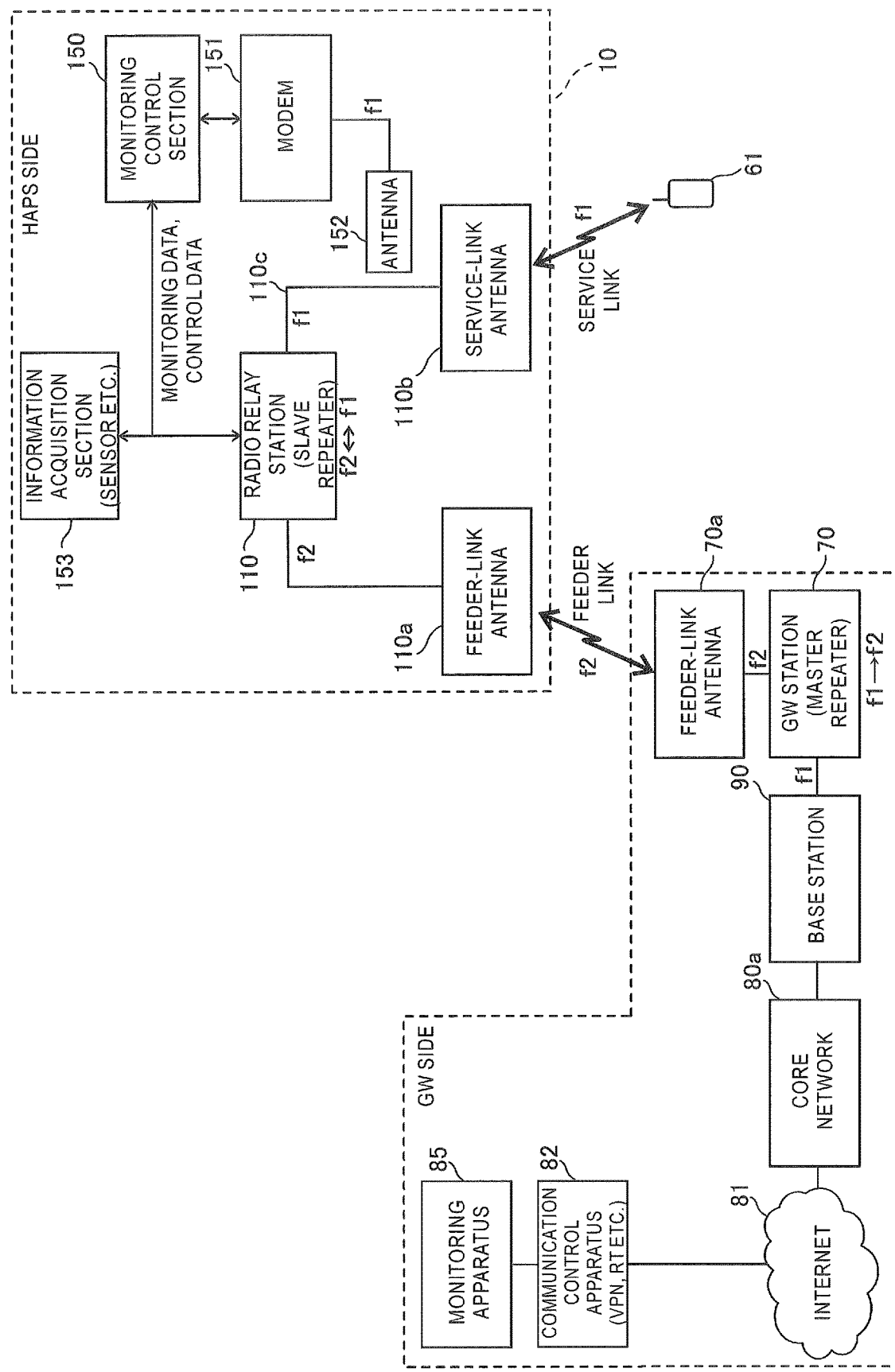
FIG. 14 is a block diagram showing still another configuration example of a HAPS monitoring system according to the embodiment.
Figure 15:
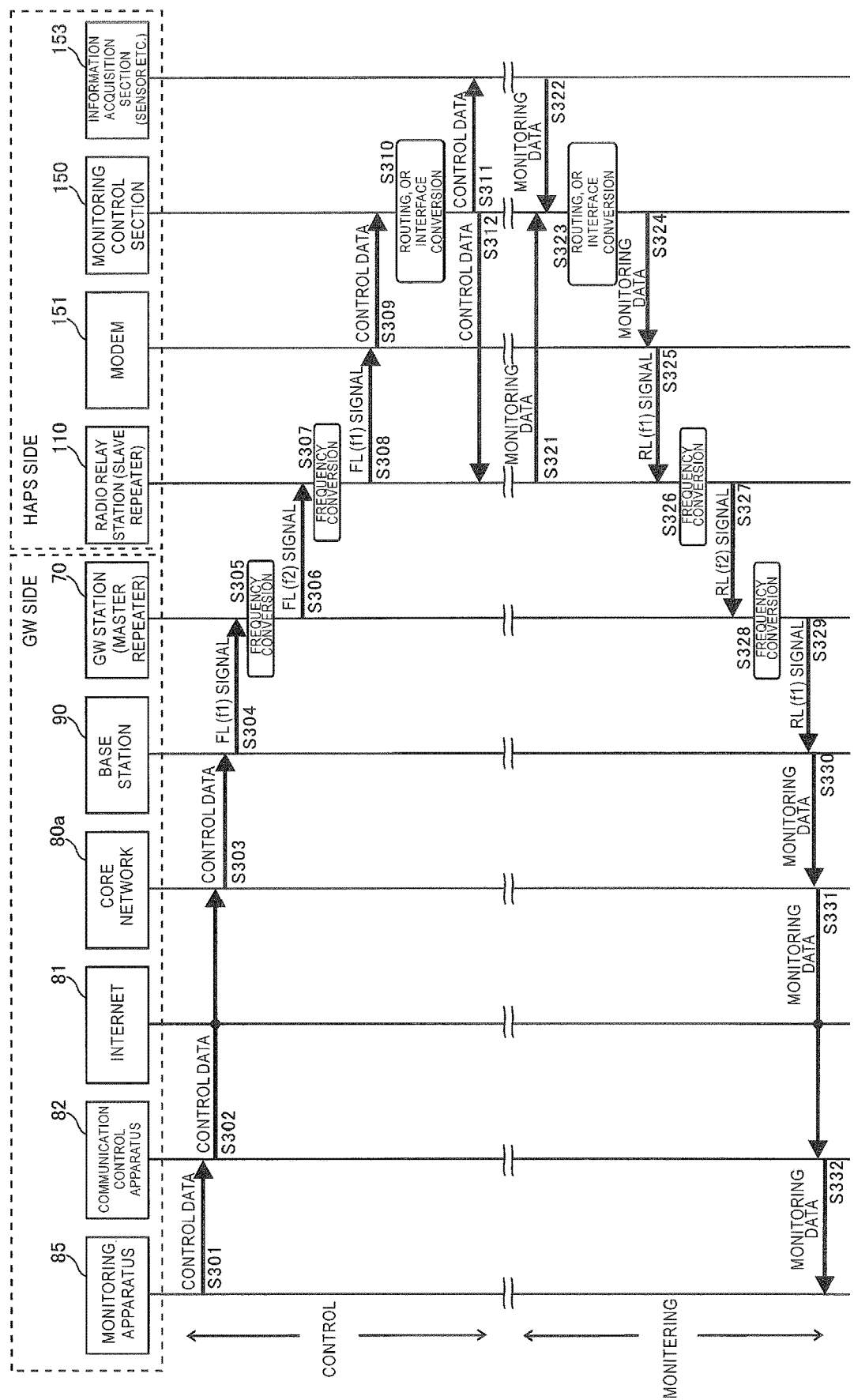
FIG. 15 is a sequence diagram showing an example of a data flow in the HAPS monitoring system in FIG. 14.

FIG. 14 is a block diagram showing still another configuration example of a HAPS monitoring system according to the embodiment, and FIG. 15 is a sequence diagram showing an example of a data flow in the HAPS monitoring system in FIG. 14. It is noted that, in FIG. 14 and FIG. 15, explanations of portions common to those in FIG. 10 and FIG. 11 described above are omitted.

In the HAPS monitoring system in FIG. 14, the monitoring apparatus 85 of the GW side is connected to the base station 90 via the communication control apparatus 82, the Internet 81, and the core network 80a. The communication control apparatus 82 is, for example, a VPN (Virtual Private Network) server or a RT (router).

In a remote control of the HAPS 10 in FIG. 15, the control data transmitted from the monitoring apparatus 85 is transmitted to the base station 90 via the communication control apparatus 82, the internet 81 and the core network 80a (S301 to S303). When receiving the control data from the monitoring apparatus 85, the base station 90 transmits a signal of the frequency f1 generated based on the control data, to the GW station (master repeater) 70, as a forward link (FL) signal (S304).

In a remote monitoring of the HAPS 10 in FIG. 15, when receiving a reverse link (RL) signal including a monitoring data from the GW station 70, the base station 90 performs a demodulation processing and a data processing on the reverse link (RL) signal, restores the monitoring data included in the reverse link (RL) signal, and transmits the monitoring data to the monitoring apparatus 85 via the core network 80a, the Internet 81 and the communication control apparatus 82 (S329 to S332).

As described above, according to the embodiment in FIG. 14 and FIG. 15, since the monitoring information, which is associated with a status of the HAPS 10 having the radio relay station 110 that functions as a slave repeater for realizing a three-dimensional network, can be transmitted to the monitoring apparatus 85 connected to the Internet 81 via the feeder link used in the HAPS 10, the status of the HAPS 10 can be monitored from the communication network side without providing a dedicated line.

Figure 16:
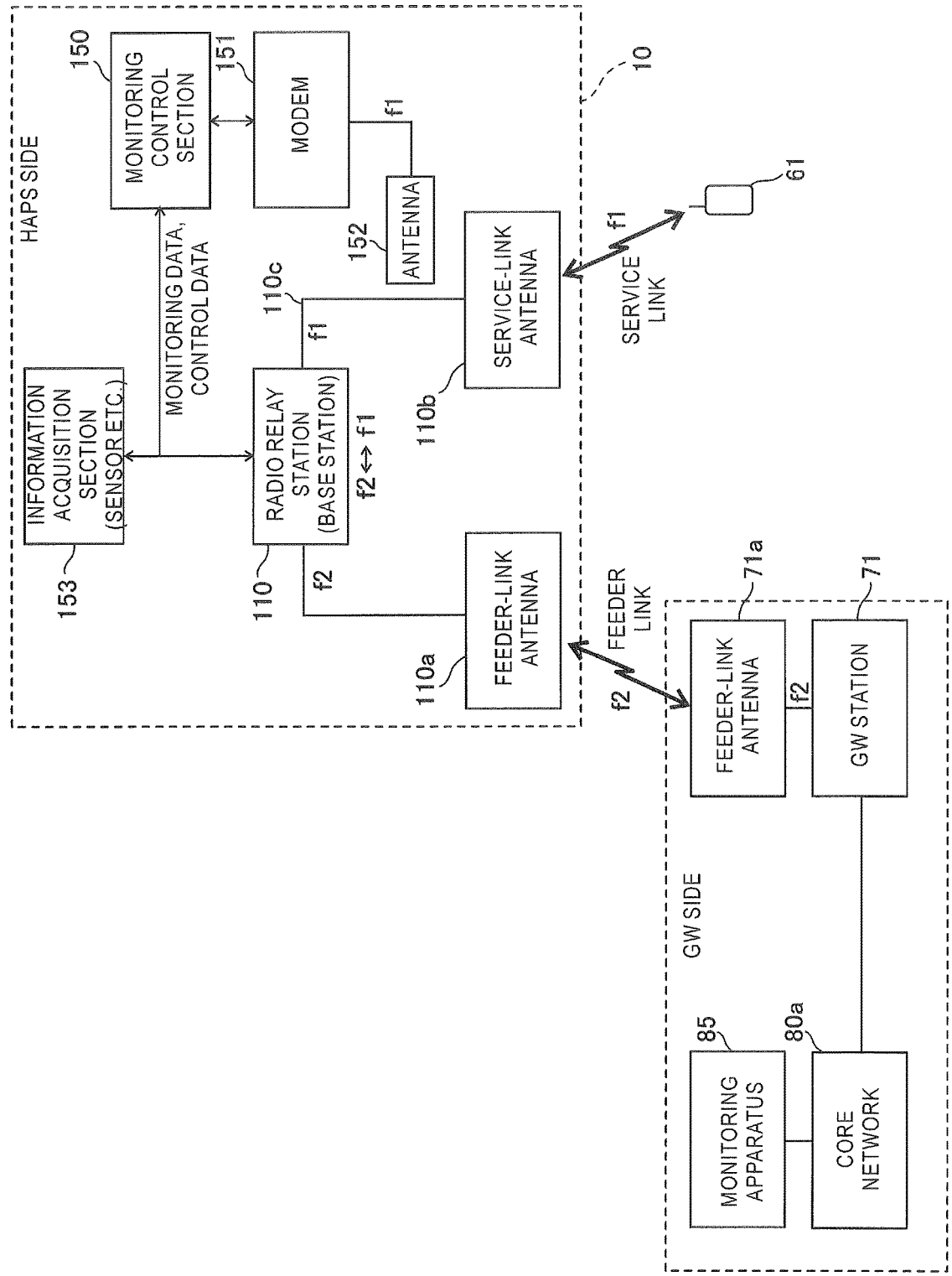
FIG. 16 is a block diagram showing still another configuration example of a HAPS monitoring system according to the embodiment.
Figure 17:
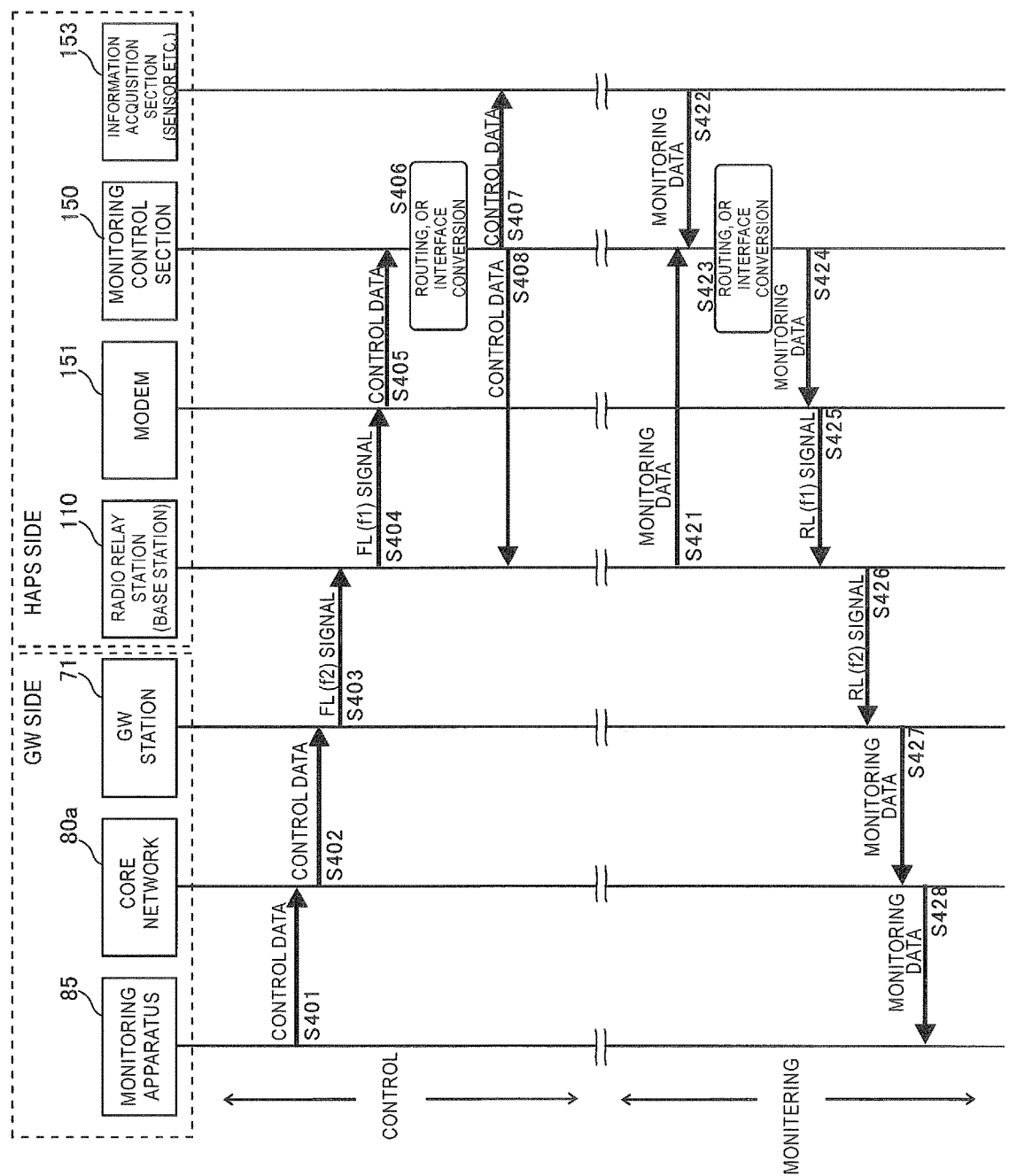
FIG. 17 is a sequence diagram showing an example of a data flow in the HAPS monitoring system in FIG. 16.

FIG. 16 is a block diagram showing still another configuration example of the HAPS monitoring system according to the embodiment, and FIG. 17 is a sequence diagram showing an example of a data flow in the HAPS monitoring system in FIG. 16. It is noted that, in FIG. 16 and FIG. 17, explanations of portions common to those in FIG. 10 and FIG. 11 described above are omitted.

In the HAPS monitoring system in FIG. 16, a GW station 71 is provided, which can transmit and receive a data to and from the monitoring apparatus 85 without going through a base station. The radio relay station 110 provided in the HAPS 10 functions as a base station (eNodeB) instead of a slave repeater.

In a remote control of the HAPS 10 in FIG. 17, the control data transmitted from the monitoring apparatus 85 is transmitted to the GW station 71 via the core network 80a (S401, S402). When receiving the control data from the monitoring apparatus 85, the GW station 71 transmits a signal of the frequency f2 generated based on the control data, to the radio relay station 110 of the HAPS 10, as a forward link (FL) signal of the feeder link (S403). When receiving the forward link (FL) signal of the feeder link from the GW station 71, the radio relay station 110 transmits the signal of the frequency f1, which is generated based on the control data included in the forward link (FL) signal, to the service-link antenna 110b via the service-link signal path 110c, as a forward link (FL) signal of the service link (S404).

In a remote monitoring of the HAPS 10 in FIG. 17, the radio relay station (base station) 110 of the HAPS 10 performs a demodulation processing and a data processing on a reverse link (RL) signal of the service link received via the service-link signal path 110c or the service-link antenna 110b, restores a monitoring data included in the reverse link (RL) signal, generates a reverse link (RL) signal of the feeder link of the frequency f2 based on the monitoring data, and transmits the reverse link (RL) signal to the GW station 71 from the feeder-link antenna 110a (S426). When the GW station 71 receives the reverse link (RL) signal of the feeder link of the frequency f2 from the radio relay station (slave repeater) 110 of the HAPS 10 via the feeder-link antenna 71a, the GW station 71 performs a demodulation processing and a data processing on the reverse link (RL) signal, restores a monitoring data included in the reverse link (RL) signal, and transmits the monitoring data to the monitoring apparatus 85 via the core network 80a (S427, S428).

As described above, according to the embodiment in FIG. 16 and FIG. 17, since the monitoring information, which is associated with a status of the HAPS 10 having the radio relay station 110 that functions as a base station for realizing a three-dimensional network, can be transmitted to the monitoring apparatus 85 connected to the core network 80a via the feeder link used in the HAPS 10, the status of the HAPS 10 can be monitored from the communication network side without providing a dedicated line.

Figure 18:
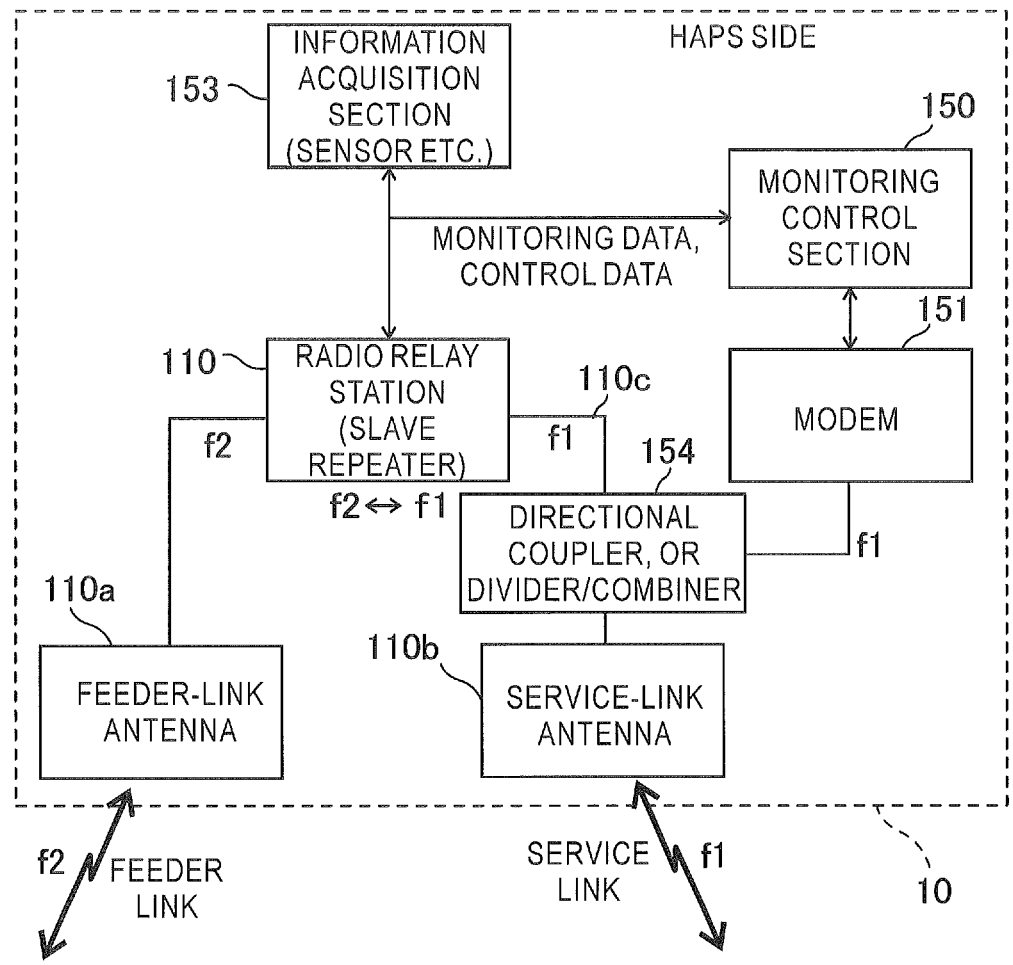
FIG. 18 is a block diagram showing another configuration example of a HAPS in a HAPS monitoring system according to the embodiment.

FIG. 18 is a block diagram showing another configuration example of the HAPS 10 in the HAPS monitoring system according to the embodiment. It is noted that, in the HAPS 10 in FIG. 18, explanations of portions common to those in FIG. 10 described above are omitted.

In the HAPS 10 in FIG. 18, the modem 151 is connected not to the antenna 152 but to a directional coupler 154 provided in the service-link signal path 110c between the radio relay station 110 and the service-link antenna 110b. Herein, a divider/combiner may be provided instead of the directional coupler 154.

It is noted that, the process steps and configuration elements of the radio relay station of the communication relay apparatus such as the HAPSs 10 and 20, the feeder station, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, base station, base station apparatus, radio relay station apparatus, terminal apparatus (user apparatus, mobile station, communication terminal), remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar-plane type)
20 HAPS (airship type)
40 cell-formation target airspace
41, 42, 43 three-dimensional cell
50 airspace where HAPS is located
60 drone
61 terminal apparatus
65 airplane
70 gateway station (master repeater)
71 gateway station
70a, 71a feeder-link antenna
72 artificial satellite
80 mobile communication network
80a core network 81 Internet
82 communication control apparatus
85 monitoring apparatus (control center)
86 server
90 base station (eNodeB)
91 communication control apparatus
92 modem
100, 200, 300 beam
110, 210 radio relay station
110a feeder-link antenna
110b service-link antenna
110c service-link signal path
150 monitoring control section
151 modem
152 antenna
153 information acquisition section
154 directional coupler

The invention claimed is:

1. A radio relay apparatus capable of flying and moving in an upper airspace, the radio relay apparatus comprising:
a first antenna for transmitting and receiving a radio signal of a feeder link to and from a gateway station on a communication network side provided on the ground or on the sea;
a second antenna for transmitting and receiving a radio signal of a service link to and from a terminal apparatus;
a relay processing section for relaying the radio signal of the feeder link and the radio signal of the service link, the relay processing section being provided between the first antenna and the second antenna;
an information acquisition section for acquiring monitoring information; and
an information communication section for transmitting the monitoring information to the communication network side via the feeder link,
wherein the information communication section comprises:
a monitoring antenna for transmitting and receiving a radio signal associated with the monitoring information to a monitoring apparatus or control information from the monitoring apparatus as the radio signal of the service link, the monitoring antenna being disposed in a non-contact state with a service-link signal path connecting between the second antenna and the relay processing section in the radio relay apparatus so as to transmit the radio signal of the monitoring information toward the service-link signal path and so as to receive the radio signal of the control information from the service-link signal path; and
a modem for converting a monitoring data of the monitoring information to a monitoring data signal by performing a modulation on the monitoring data, for transmitting the monitoring data signal as a reverse link signal of the service link toward the service-link signal path via the monitoring antenna, for receiving a control data signal as a forward link signal of the service link from the service-link signal path antenna via the monitoring antenna, and for converting the control data signal to a control data of the control information by performing a demodulation on the control data signal.

2. A communication system comprising:
the radio relay apparatus according to claim 1;
a gateway station on the communication network side for communicating with the radio relay apparatus via the feeder link; and
a monitoring apparatus on the communication network side for receiving the monitoring information.

3. The communication system according to claim 2,
wherein the radio relay apparatus comprises a control section for controlling the radio relay apparatus based on the control information, and
wherein the information communication section receives the control information via the feeder link, and
wherein the modem converts between the reverse link signal or the forward link signal of the service link, and the data signal of the control information.

4. The communication system according to claim 3, wherein the control information includes target flight-route information.

5. The communication system according to claim 2,
wherein the monitoring information includes information on at least one of a current position, flight-route history information, a velocity against air, a velocity against the ground and a propulsive direction of the radio relay apparatus, a wind velocity and a wind direction of an airflow around the radio relay apparatus, and an atmospheric pressure and a temperature around the radio relay apparatus.

6. The communication system according to claim 2,
wherein the monitoring information includes at least one of communication quality information of the feeder link to and from the gateway station, and communication quality information of the service link to and from the terminal apparatus.

7. The communication system according to claim 2,
wherein a frequency of the feeder link and a frequency of the service link are different from each other, and
wherein the relay processing section comprises a function of frequency conversion between the frequency of the feeder link and the frequency of the service link.

8. The communication system according to claim 2,
wherein the gateway station is a master repeater connected to a base station for a mobile communication, and
wherein the radio relay apparatus is a slave repeater for performing a radio communication with the master repeater.

9. The communication system according to claim 2,
wherein the radio relay apparatus is a base station for a mobile communication.

10. The communication system according to claim 2,
wherein the monitoring information is monitoring information on a status of the radio relay apparatus.

11. The radio relay apparatus according to claim 1, further comprising a control section for controlling the radio relay apparatus based on the control information,
wherein the information communication section receives the control information via the feeder link, and
wherein the modem converts between the reverse link signal or the forward link signal of the service link, and the data signal of the control information.

12. The radio relay apparatus according to claim 11, wherein the control information includes target flight-route information.

13. The radio relay apparatus according to claim 1,
wherein the monitoring information includes information on at least one of a current position, flight-route history information, a velocity against air, a velocity against the ground and a propulsive direction of the radio relay apparatus, a wind velocity and a wind direction of an airflow around the radio relay apparatus, and an atmospheric pressure and a temperature around the radio relay apparatus.

14. The radio relay apparatus according to claim 1, wherein the monitoring information includes at least one of communication quality information of the feeder link to and from the gateway station, and communication quality information of the service link to and from the terminal apparatus.

15. The radio relay apparatus according to claim 1, wherein a frequency of the feeder link and a frequency of the service link are different from each other, and
wherein the relay processing section comprises a function of frequency conversion between the frequency of the feeder link and the frequency of the service link.

16. The radio relay apparatus according to claim 1, wherein the gateway station is a master repeater connected to a base station for a mobile communication, and
wherein the radio relay apparatus is a slave repeater for performing a radio communication with the master repeater.

17. The radio relay apparatus according to claim 1, wherein the radio relay apparatus is a base station for a mobile communication.

18. The radio relay apparatus according to claim 1, wherein the monitoring information is monitoring information on a status of the radio relay apparatus.

19. A radio relay apparatus capable of flying and moving in an upper airspace, the radio relay apparatus comprising:
a first antenna for transmitting and receiving a radio signal of a feeder link to and from a gateway station on a communication network side provided on the ground or on the sea;
a second antenna for transmitting and receiving a radio signal of a service link to and from a terminal apparatus;
a relay processing section for relaying the radio signal of the feeder link and the radio signal of the service link, the relay processing section being provided between the first antenna and the second antenna;
an information acquisition section for acquiring monitoring information; and
an information communication section for transmitting the monitoring information to the communication network side via the feeder link,
wherein the information communication section comprises:
a directional coupler or a divider/combiner for transmitting and receiving a radio signal associated with the monitoring information to a monitoring apparatus or control information from the monitoring apparatus as the radio signal of the service link, the directional coupler or the divider/combiner being provided in a service-link signal path connecting between the second antenna and the relay processing section in the radio relay apparatus so as to transmit the radio signal of the monitoring information toward the service-link signal path and so as to receive the radio signal of the control information from the service-link signal path; and
a modem for converting a monitoring data of the monitoring information to a monitoring data signal by performing a modulation on the monitoring data, for transmitting the monitoring data signal as a reverse link signal of the service link toward the service-link signal path via the directional coupler or the divider/combiner, for receiving a control data signal as a forward link signal of the service link from the service-link signal path antenna via the directional coupler or the divider/combiner, and for converting the control data signal to a control data of the control information by performing a demodulation on the control data signal.

20. A communication system comprising:
the radio relay apparatus according to claim 19;
a gateway station on the communication network side for communicating with the radio relay apparatus via the feeder link; and
a monitoring apparatus on the communication network side for receiving the monitoring information.

21. The communication system according to claim 20, wherein the radio relay apparatus comprises a control section for controlling the radio relay apparatus based on the control information, and
wherein the information communication section receives the control information via the feeder link, and
wherein the modem converts between the reverse link signal or the forward link signal of the service link, and the data signal of the control information.

22. The communication system according to claim 21, wherein the control information includes target flight-route information.

23. The communication system according to claim 20, wherein the monitoring information is monitoring information on a status of the radio relay apparatus.

24. The communication system according to claim 20, wherein the monitoring information includes information on at least one of a current position, flight-route history information, a velocity against air, a velocity against the ground and a propulsive direction of the radio relay apparatus, a wind velocity and a wind direction of an airflow around the radio relay apparatus, and an atmospheric pressure and a temperature around the radio relay apparatus.

25. The communication system according to claim 20, wherein the monitoring information includes at least one of communication quality information of the feeder link to and from the gateway station, and communication quality information of the service link to and from the terminal apparatus.

26. The communication system according to claim 20, wherein a frequency of the feeder link and a frequency of the service link are different from each other, and
wherein the relay processing section comprises a function of frequency conversion between the frequency of the feeder link and the frequency of the service link.

27. The communication system according to claim 20, wherein the gateway station is a master repeater connected to a base station for a mobile communication, and
wherein the radio relay apparatus is a slave repeater for performing a radio communication with the master repeater.

28. The radio relay apparatus according to claim 19, further comprising a control section for controlling the radio relay apparatus based on the control information,
wherein the information communication section receives the control information via the feeder link, and
wherein the modem converts between the reverse link signal or the forward link signal of the service link, and the data signal of the control information.

29. The radio relay apparatus according to claim 28, wherein the control information includes target flight-route information.

30. The radio relay apparatus according to claim 19, wherein the monitoring information is monitoring information on a status of the radio relay apparatus.

31. The radio relay apparatus according to claim 19, wherein the monitoring information includes information on at least one of a current position, flight-route history information, a velocity against air, a velocity against the ground and a propulsive direction of the radio relay apparatus, a wind velocity and a wind direction of an airflow around the radio relay apparatus, and an atmospheric pressure and a temperature around the radio relay apparatus.

32. The radio relay apparatus according to claim 19, wherein the monitoring information includes at least one of communication quality information of the feeder link to and from the gateway station, and communication quality information of the service link to and from the terminal apparatus.

33. The radio relay apparatus according to claim 19, wherein a frequency of the feeder link and a frequency of the service link are different from each other, and wherein the relay processing section comprises a function of frequency conversion between the frequency of the feeder link and the frequency of the service link.

34. The radio relay apparatus according to claim 19, wherein the gateway station is a master repeater connected to a base station for a mobile communication, and wherein the radio relay apparatus is a slave repeater for performing a radio communication with the master repeater.

35. The radio relay apparatus according to claim 19, wherein the radio relay apparatus is a base station for a mobile communication.

* * * * *